United States Patent
Kondoh et al.

(10) Patent No.: US 7,606,672 B2
(45) Date of Patent: Oct. 20, 2009

(54) PLANT PROTECTIVE INSTRUMENTATION EQUIPMENT

(75) Inventors: Yutaka Kondoh, Kanagawa-ken (JP);
Masahiko Kamiyama, Tokyo (JP);
Hiroshi Nishikawa, Kanagawa-ken (JP);
Hiroshi Sakamoto, Kanagawa-ken (JP);
Teruji Tarumi, Kanagawa-ken (JP);
Akira Yunoki, Saitama-ken (JP);
Yoshimi Maekawa, Saitama-ken (JP);
Katuya Kondoh, Tokyo (JP); Mikio Izumi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 471 days.

(21) Appl. No.: 10/396,687

(22) Filed: Mar. 26, 2003

(65) Prior Publication Data

US 2004/0078101 A1 Apr. 22, 2004

(30) Foreign Application Priority Data

Mar. 27, 2002 (JP) .............................. 2002-088942

(51) Int. Cl.
*G01B 5/28* (2006.01)

(52) U.S. Cl. .................................................. 702/40
(58) Field of Classification Search ............... 702/40, 702/181, 8; 700/49, 79, 292; 250/367; 340/573.1; 376/259; 382/124; 60/276, 277, 399, 646, 60/779
See application file for complete search history.

(56) References Cited

U.S. PATENT DOCUMENTS 5,264,939 A * 11/1993 Chang ......................... 348/322
5,287,264 A * 2/1994 Arita et al. ................... 700/709
5,930,317 A * 7/1999 Kono ........................ 376/259
6,255,657 B1* 7/2001 Cole et al. ................... 250/367
6,259,804 B1* 7/2001 Setlak et al. ................. 382/124
6,518,909 B1* 2/2003 Yang et al. ................... 341/155
7,114,325 B2* 10/2006 Surnilla et al. ................ 60/276
2002/0052673 A1* 5/2002 Seong et al. ................. 700/292
2003/0216888 A1* 11/2003 Ridolfo ....................... 702/181
2003/0235264 A1* 12/2003 Pappone ..................... 376/259
2004/0178913 A1* 9/2004 Penuela et al. ............ 340/573.1

* cited by examiner

*Primary Examiner*—Tung S Lau
*Assistant Examiner*—Xiuquin Sun
(74) *Attorney, Agent, or Firm*—Foley & Lardner LLP

(57) ABSTRACT

A plant protection instrumentation equipment, comprises, a sensor that detects a process signal indicating a quantity of a state of a plant, a plurality of A/D converters, each of the A/D converters converts the process signal into a digital signal and outputs a value corresponding to the digital signal, a plurality of instrumentation circuits, each of the instrumentation circuits receives the value corresponding to the process signal and performs a logical operation using the value, and a judgment circuit that judges the state of the plant based on outputs of the plurality of instrumentation circuits and outputs an operation signal based on the process signal, wherein each of the instrumentation circuits comprises a logical integrated circuit including a set value comparator that compares the value corresponding to the process signal with a predetermined set value, and outputs a signal when the value corresponding to the process signal exceeds the set value.

20 Claims, 13 Drawing Sheets

PLANT PROTECTIVE INSTRUMENTATION EQUIPMENT

CROSS-REFERENCE TO RELATED APPLICATIONS

This application is based upon and claims the benefit of priority from the prior Japanese Patent Application No. 2002-88942 filed on Mar. 27, 2002, the entire contents of which are incorporated herein by reference.

BACKGROUND OF THE INVENTION

1. Field of the Invention

This invention concerns plant protection instrumentation equipment of, for example, a nuclear power plant.

2. Description of the Related Art

In a power generation plant, such as a nuclear power generation plant, a safety protection system is installed to prevent an abnormal situation which may compromise safety of the plant when the abnormality is anticipated or to control such abnormality. Conventionally, plant protection instrumentation equipment, as shown in FIG. 13, has been arranged as one of the safety protection systems in the plant. This plant protection instrumentation equipment has instrumentation circuits LA-1 and LA-2. This instrumentation circuit LA-1 (LA-2) has a sensor group {A1-1, ..., A1-n} ({A2-1, ..., A2-n}) which detects a plurality of process signals of temperature, pressure, output of the reactor, and so on, and outputs process signals, and a set value comparison circuit group {MS1-1, ..., MS1-n} ({MS2-1, ..., MS2-n}) which receives the process signals from the respective sensor group {A1-1, ..., A1-n} ({A2-1, ..., A2-n}) to compare these signals with predetermined set values, and outputs an operation signal when the signals exceed the set values. These instrumentation circuits LA-1, LA-2 constitute channel A composed of two channels. Two instrumentation circuits LB-1, LB-2, which have similar components as the instrumentation circuits LA-1, LA-2, respectively, constitute channel B composed of two channels. That is, this overall instrumentation equipment is separated into two channels A, B each of which has two sectional channels. And this instrumentation equipment has a control circuit C which outputs an operation signal such as a trip signal to each pieces of plant equipment based on combination of output signals from the instrumentation circuits. The signals outputted from the instrumentation circuits are processed with adopting two sets of one-out-of-two logic. In other words, in each channel A or B, when one trip signal is outputted, that is, one set value comparison circuit judges a process signal exceeding a set value, the corresponding channel is tripped, and an operation signal 15 shown in FIG. 13 is generated when both channels A, B are tripped simultaneously. One channel of each instrumentation circuit has a single configuration, i.e., it is not multiplexed.

As for such plant protection instrumentation equipment, instrumentation circuits that compare and detect each process signal with a set value may be constituted by hardware device as exclusive use of the instrumentation, or they may be constituted by a microprocessor programmed with software. In case of an exclusively hardware device, a plurality of hardware devices are necessary with respect to each of a plurality of the process signals. On the other hand, in case of a microprocessor configuration, all signal processing toward a plurality of process signals can be performed by one microprocessor.

Since safety protection system of a plant is important, it requires a highly reliable design. For this reason, in case of constituting the instrument circuit by a microprocessor, V & V (verification and validation) is performed for preventing failure due to common factor of the software and for securing high reliability of the software. V&V is an activity for quality assurance composed of verification operation of confirming that function required to digital safety protection system is properly reflected from superordinate process to subordinate process on each process of design and manufacture of the software, and validation operation of confirming soundness that required function is properly realized on system manufactured through the verification operation. Specifically, as a verification operation for confirming that the software is manufactured in accordance with a design specification, a confirmation process of mutual relation between specification in which design information is written and specification for manufacturing is carried out. And as a validation process, an imitation signal similar to an actual input signal is inputted into the instrumentation equipment constituted by a microprocessor for checking that an operation output is made according to the design specification. It is preferred that a third party different from a designer or a manufacturer of the software should perform such V & V.

Moreover, the instrumentation circuit using a microprocessor that is performed with software has a self-diagnostic function, such as watchdog timer surveillance, that is equipped with the microprocessor as a standard function, for automatic by-pass of multiplexed systems, alarm output, and so on.

In a conventional plant protection instrumentation equipment, a test input signal for confirming comparison and detection between a process signal and a set value are perfectly performed is inputted from a parallel circuit of a line other than an input terminal to which the process signal is actually inputted.

Moreover, concerning the microprocessor operated by software, maintenance device exclusively used to adjusting set value for the comparison, which has enough actual performance, is arranged for enabling visualization of the program mounted in the microprocessor and comparison and extraction of changed part before and after the change.

However, in the above-mentioned conventional plant protection instrumentation equipment with the microprocessor, operated by software, applied as the instrumentation circuit, it is necessary to perform both verification of adequate manufacturing of the software in accordance with required matter of the design specification and validation of an accurate output along with the design specification. Therefore, it requires a lot of tasks and time compared with design and manufacture of ordinary software used outside the usual safety protection function, and this becomes a major factor for raising product cost.

On the other hand, in case of applying hardware device for exclusive use without using software in the instrumentation circuit, it is also necessary to confirm adequacy of the product manufacture along with control logic written in the design specification by means of visualization, test or other means. However, it is extremely difficult to visualize dense control logic such as a logical integrated circuit constituting the hardware device and its operation status. For this reason, it is necessary to input all input patterns of ON and OFF of every digital input of the control logic of the hardware device and check agreement of the result of logical operation and the design specification, so such confirmation implementation increases the number of whole points of the digital input, and accordingly, all input patterns multiplies exponentially and increases time and the work for the test.

And concerning the conventional plant protection instrumentation equipment composed of two sets of one-out-of-two logic, when a single failure is occurred and a plant signal of a sensor is by-passed and moreover another one sensor of power source same as the sensor in failure also fails, even if the plant status is actually changed so that it becomes necessary to operate devices of protection system, the two sets of one-out-of-two logic cannot becomes ON state and the operation signal is not outputted, thus there is no by-pass function. Similarly, in maintenance or surveillance test while the plant is in operation, the two sets of one-out-of-two logic cannot be ON state, thus it is necessary to perform the maintenance or the test with one group being in operation. Under this circumstance, when additionally failure or operation mistake occurs, the operation is changed into a safety protection system side. To reduce risk from suspension of the plant, the system should be configured so that half trip can be avoided even when single failure, exchange work or surveillance test of the equipment is performed in plant operating. Moreover, in applying software, the possibility that multiplexed control devices fail simultaneously due to bugs which the software potentially includes cannot be eliminated completely.

When a logical integrated circuit is applied to the instrumentation circuit constituting a logic circuit, a self-diagnostic function, which the microprocessor has, cannot be given as a standard function. Thus, when equipment breaks down due to malfunction or inoperation, this breakdown cannot be detected in advance. Consequently, it is necessary to detect the failure of a malfunction side or an inoperative side by multiplexing each process signal and using an input of one of the multiplexing signal, which can become convoluted.

The examination incoming signal for performing comparison detection with a process signal and set value is making the process signal input in the plant protection instrumentation equipment of a nuclear power generation plant from the parallel circuit from another line different from the actually inputted input terminal. For this reason, the function of the instrumentation equipment of an input, processing, and an output was not able to be checked simultaneously consistently. Moreover, even when a signal was inputted from a different line, as for the output end, the trip output was performed at the time of an examination for a real circuit and combination. In case of constituting the plant protection instrumentation equipment of a plant such as a nuclear power plant by the microprocessor, it is necessary to arrange a maintenance equipment of exclusive use of adjusting a set value for comparing and detecting the process signal, and the verification and validation works should be performed after adjusting the set value. The adjustment of the set value by the maintenance equipment and the verification and validation works are so complicated that skill is required to perform securely. Thus, it is preferable that it is unnecessary to use software in the adjustment work of the set value and the equipment is constituted such that contents thereof after the change of the set value can be easily understood.

SUMMARY OF THE INVENTION

This invention is made to solve the above-mentioned subject, and aims at obtaining plant protection instrument equipment which is unnecessary to perform the verification and validation works, and enables a test for check of operation easily and detection of abnormality of the instrumentation circuits rapidly, and provides a self-diagnostic function.

Other and further objects of this invention will become apparent upon an understanding of the illustrative embodiments to be described herein or will be indicated in the appended claims while various other advantages not referred to herein will become apparent to one skilled in the art upon employment of the invention in practice.

According to one aspect of the present invention, there is provided a plant protection instrumentation equipment, comprising, a sensor that detects a process signal indicating a quantity of a state of a plant, a plurality of A/D converters, each of the A/D converters converts the process signal into a digital signal and outputs a value corresponding to the digital signal, a plurality of instrumentation circuits, each of the instrumentation circuits receives the value corresponding to the process signal and performs a logical operation using the value, and a judgment circuit that judges the state of the plant based on outputs of the plurality of instrumentation circuits and outputs an operation signal based on the process signal, wherein each of the instrumentation circuits comprises a logical integrated circuit including a set value comparator that compares the value corresponding to the process signal with a predetermined set value, and outputs a signal when the value corresponding to the process signal exceeds the set value.

According to another aspect of the present invention, there is provided a plant protective instrumentation equipment, comprising, a sensor that detects a process signal indicating a quantity of a state of a plant, a plurality of A/D converters, each of the A/D converters converts the process signal into a digital signal and outputs a value corresponding to the digital signal, first to third instrumentation circuits, each of the instrumentation circuits receives the value corresponding to the process signal and performs a logical operation using the value, and a judgment circuit that judges the state of the plant based on outputs of the first to third instrumentation circuits and outputs an operation signal based on the process signal, wherein each of the instrumentation circuits comprises a logical integrated circuit including a set value comparator that compares the value corresponding to the process signal with a predetermined set value, and outputs a signal when the value corresponding to the process signal exceeds the set value, and wherein at least one logical integrated circuit of the first instrumentation circuit is different in at least one design factor from at least one logical integrated circuit either of the second and third instrumentation circuits.

According to still another aspect of the present invention, there is provided plant protective instrumentation equipment, comprising, a radiation detector that outputs an analog signal corresponding to radiation dosage detected in a plant, a radiation monitoring device that monitors behavior of the radiation dosage based on the signal outputted from the radiation detector, comprising, an A/D converter that converts the analog signal outputted from the radiation detector to a digital signal, and a first radiation signal processing collective circuit, comprising, a plurality of radiation signal processing circuits, each of the radiation signal processing circuits calculates radiation dosage based on the digital signal and outputs a calculated result including a calculated radiation dosage, and an output extraction circuit that outputs a signal based on the calculation results outputted from the radiation signal processing circuits based on a predetermined extraction rule, wherein each of the radiation signal processing circuits comprises a logical integrated circuit having wiring that differs at least in part from at least one other radiation signal processing circuit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION OF PREFERRED EMBODIMENTS OF THE INVENTION

Figure 1:
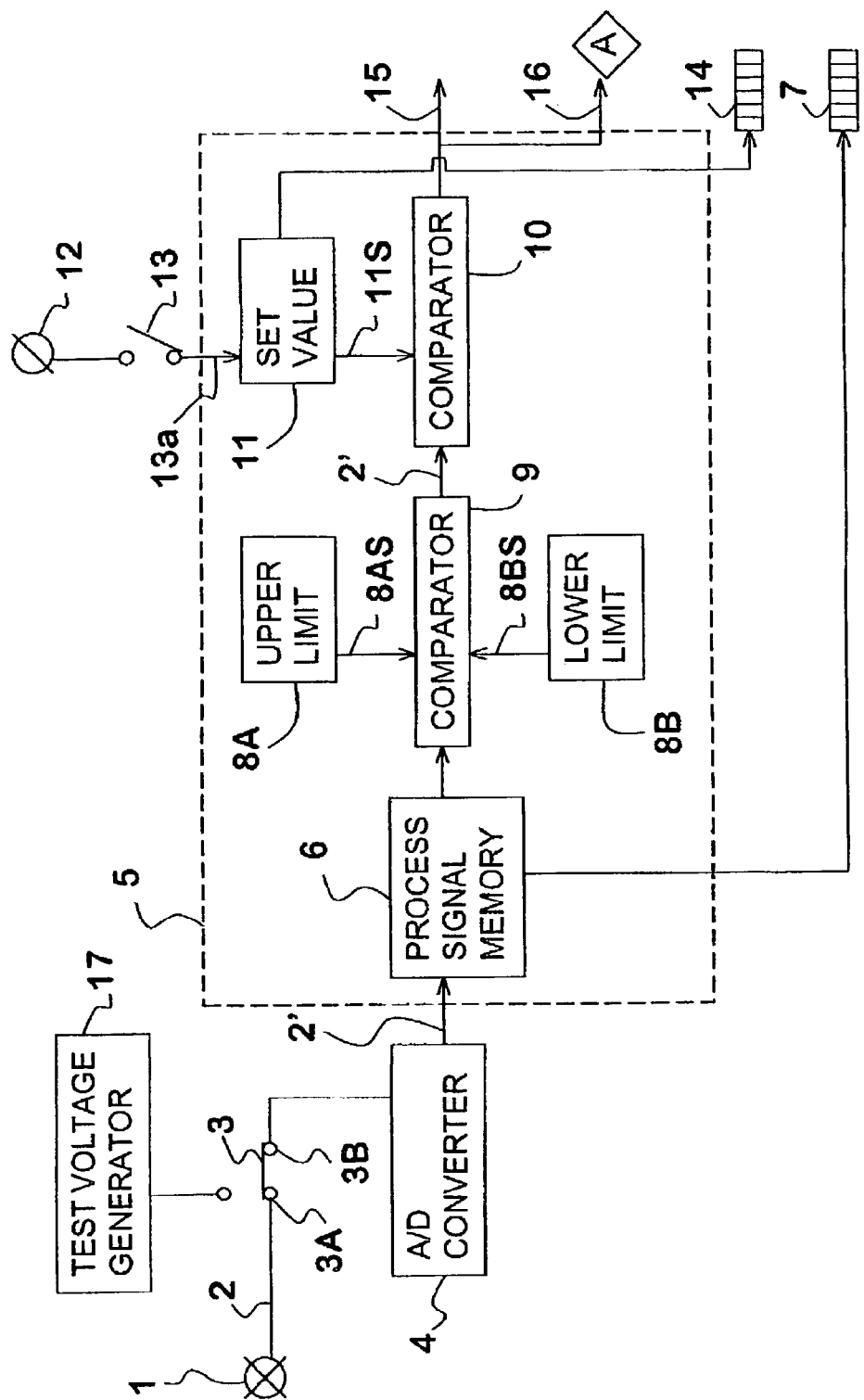
FIG. 1 is a block diagram showing function of plant protection instrumentation equipment according to an aspect of this invention.

Referring now to the drawings, wherein like reference numerals designate identical or corresponding parts throughout the several views, an embodiment of a plant protection instrumentation equipment in this invention will be described below.

First Embodiment

FIG. 1 functionally shows a processing flow of a process signal in plant protection instrumentation equipment. A sensor 1 for monitoring plant status detects a process signal designating process state quantity of a plant, and a process signal 2 is inputted into a test selector switch 3. If the test selector switch 3 is in a usual use side 3A at this time, the process signal 2 is converted into a digital signal by an analog-to-digital signal converter (A/D converter) 4 and a value corresponding to the process signal 2' is read by a process signal memory 6 installed in a logic or logical integrated circuit 5, and simultaneously this value of the process signal 2' read into the process signal memory 6 is displayed on a process value digital display 7. In the logical integrated circuit 5, a tolerance level comparator 9 compares the value corresponding to the process signal 2' outputted form the process signal memory 6 with a upper limit 8AS set by a upper limit adjuster 8A and a lower limit 8BS set by a lower limit adjuster 8B.

Consequently, if the value of the process signal 2 is within a set tolerance level, the value corresponding to the process signal 2' is sent to a set value comparison portion 10 and this set value comparison portion 10 compares the value corresponding to the process signal 2' and set value signal 11S saved on a set value storage 11. The set value signal 11S is selected as a digital value by a setting switch 12 and stored in the set value storage 11 when a change permission switch 13 is closed, and displayed on a set value digital indicator 14.

The process signal 2 is compared with the set value signal 11S by the set value comparison portion 10, and an operation signal 15 such as a trip output is outputted outside the logical integrated circuit 5 when the value corresponding to the process signal 2 exceeds the set value, and in this case an alarm output signal 16 is also outputted as appropriate.

When carrying out a confirmation test of operation of this plant protection instrumentation equipment constituted as mentioned above, the test selector switch 3 is changed into a test side 3B. A test voltage generator 17 is connected to the test side 3B of the test selector switch 3, and a test process signal 2a generated by the test voltage generator 17 is transmitted into the logical integrated circuit 5 through the A/D converter 4, and compared with a set value signal 11A saved on the set value storage 11 by the set value comparison portion 10. Consequently, an operation signal 15 such as a trip output is outputted outside the logical integrated circuit 5 for checking operation when a value corresponding to the test process signal 2a exceeds the set value.

The foregoing discussion describes the processing flow of a process signal from a functional view. In plant protection instrumentation equipment in this embodiment, the A/D converters 4 and the logical integrated circuits 5 are multiplexed, and operation signal such as a trip output is outputted by selection of signals outputted from multiplexed portions. One case of multiplex structure of this embodiment in this invention is explained hereinafter.

Figure 2:
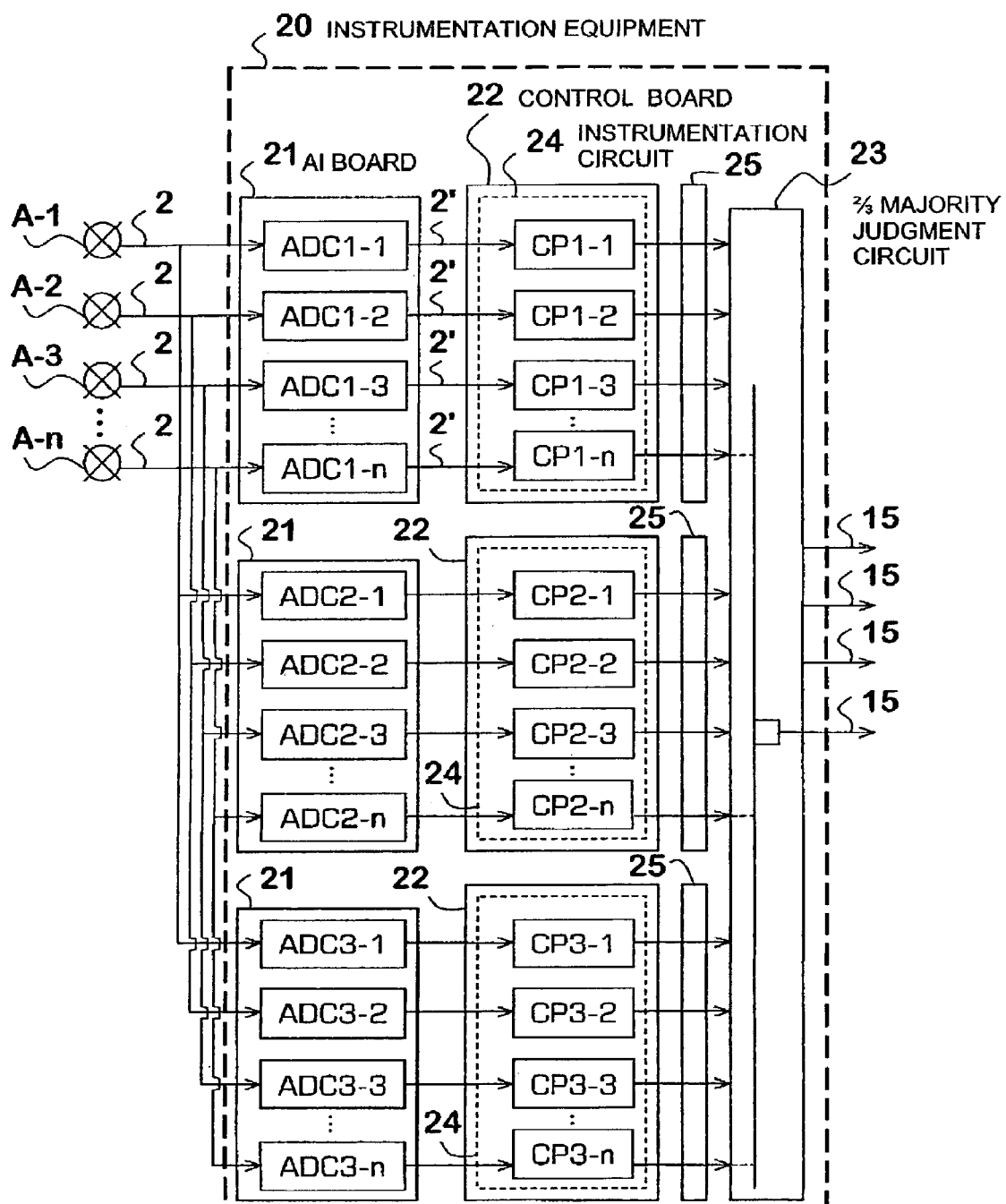
FIG. 2 is a system diagram of plant protection instrumentation equipment of a first embodiment in this invention.

FIG. 2 shows one example of this embodiment including tripled instrumentation circuits and two-thirds ($2/3$) logic for majority judgment. Plant protection instrumentation equipment 20 in this embodiment comprises a sensor group of sensors A-1, A-2, . . . , A-n, which detects a plurality of different process signals 2 designating process states of the plant, tripled sets of A/D converters ADC 1-1, ADC 1-2, . . . , ADC1-n; ADC2-1, ADC2-2, . . . , ADC2-n; ADC3-1, ADC3-2, . . . , ADC3-n, tripled sets of set value comparators CP1-1, CP1-2, . . . , CP1-n; CP2-1, CP2-2, . . . , CP2-n; CP3-1, CP3-2, . . . , CP3-n, and a majority judgment circuit 23. Each of the tripled A/D converters ADC1-1, . . . , ADC3-n receives an analog signal outputted from corresponding one of the sensors A-1, . . . , A-n, and converts the analog signal into an digital signal. Each of the tripled set value comparator CP1-1, . . . , CP3-n is composed of a logic integrated circuit, which receives an digital signal converted from an analog signal outputted from corresponding one of the sensors A-1, A-2, . . . , A-n, and compares the signal with a predetermined set value, and outputs a signal when a value corresponding to the process signal 2 exceeds a set value. The majority judgment circuit 23 judges groups of three signals outputted from the three corresponding set value comparators logically with two-third logic, and outputs different operation signals by different processes, based on the result of the judgment, into different plant components or another control devices for logical judgment.

Each of three sets of the tripled A/D converters {ADC1-1, ..., ADC1-n}, {ADC2-1, ..., ADC2-n}, {ADC3-1, ..., ADC3-n} may be mounted on an analog input board (AI board) 21 which receives process signals as analog signals outputted from the sensors, respectively. Similarly, each of three sets of the tripled set value comparators {CP1-1, ..., CP1-n}, {CP2-1, ..., CP2-n}, {CP3-1, ..., CP3-n} is constituted on an instrumentation circuit 24 mounted on a control board 22, respectively. And each group of three output signals from the tripled set value comparators {CP1-1, ..., CP1-n}, {CP2-1, ..., CP2-n}, {CP3-1, ..., CP3-n} are transmitted into the majority judgment circuit 23 as digital signals through a digital output board (DO board) 25 which receives signals outputted from the set value comparators and outputs digital signals. The A/D converters and the set value comparator are multiplexed, respectively as a signal processing circuit corresponding to each process, by making the AI boards 21, the control boards 22, and the DO boards 25 multiplexed, respectively.

The majority judgment circuit 23 receives output signals from the set value comparator and judges their majority. For instance, output signals from the set value comparators CP1-1, CP2-1, CP3-1 are processing results corresponding to a process signal outputted from the sensor A-1, and when two or all of these three signals are output signals exceeding the set value, the majority judgment circuit 23 judges that a value corresponding to the process sensor from the sensor A-1 is in excess of the set value and then outputs an operation signal corresponding to the process.

In manufacture of the tripled set value comparators CP1-1, ..., CP1-n, CP2-1, ..., CP2-n, CP3-1, ..., CP3-n, logical integrated circuits such as programmable logic devices (PLD) are used for processing by means of wiring of hardware configuration without using software by converting signal processing function into configuration of logic circuits. Here, it is preferable that each logical integrated circuit composed of the set value comparator arranged in each instrumentation circuit 24 responsive to each process is configured mutually independent, that is, it is separated logically and electrically from each other.

Moreover, it is preferable that the logical integrated circuits consist of design elements that are mutually different in each signal processing circuit. That is, for example, each logical integrated circuit constituting respective one of the set value comparators as a signal processing circuit is configured with elemental devices of which logical conversion means to a logical circuit or wiring means is different from each other logical integrated circuit. And alternatively, or in addition, it is preferable that each logical integrated circuit has a different manufacturing process or manufacturer from each other, in each signal processing circuit.

In this configuration mentioned above, for example, when a PLD is used in manufacturing the logical integrated circuit. The logical function in the PLD can be implemented in different ways, and thus, various logical circuits for fulfilling same functional signal processing can be composed. And since the PLD device enables fulfillment of signal processing by itself without an operating system (OS), it is possible that the system is easily constructed by combining a plurality of elemental devices. Thus, one signal processing circuit may be realized by one PLD device for simplifying the system, and alternatively, one signal processing unit can be realized by combining a plurality of PLD devices by separating the signal processing circuit into several simple functions and allocating each of different PLD devices to each function.

According to this plant protection instrumentation equipment configured as mentioned above, a plurality of process signals implying process state quantities of the plant are detected by the sensors A-1, ..., A-n, and each process signal is converted from an analog signal into a digital signal by the tripled A/D converters ADC1-1, ..., ADC1-n, ADC2-1, ..., ADC2-n, ADC3-1, ..., ADC3-n, and digital values corresponding the process signals are outputted. Each of the set value comparators, CP1-1, ..., CP1-n, CP2-1, ..., CP2-n, CP3-1, ..., CP3-n, which are tripled as well as the A/D converters, compares the value corresponding to the process signal and outputs a signal into the majority judgment circuit when the process signal exceeds the set value, and an operation signal 15 is outputted based on two-thirds majority judgment.

Here, if a failure due to a defect occurs in a set value comparator CP1-1 processing the process signal 2, the failure does not effect to other set value comparator CP1-2, ..., CP1-n as hardware configuration. By arranging set value comparators composed of logical integrated circuits mutually different from each other for each process signal, in checking of operations, a number of patterns of data inputted into each logical integrated circuit becomes relatively small. For example, when a number of digital bits of one process signal is twelve, there are 4,096 patterns, that is $2^{12}$, in one process signal, and since two kinds of signals, that is, a process signal and a set value, should be considered, a number of patterns corresponding one process signal input is 16,777,216, that is $4,096^2$. And if n pieces of process signals are inputted in one logical integrated circuit, the patterns number becomes the n-th power of 16,777,216. Consequently, it is extremely difficult to perform works for absolute checking of the above-mentioned number of outputs.

Figure 3:
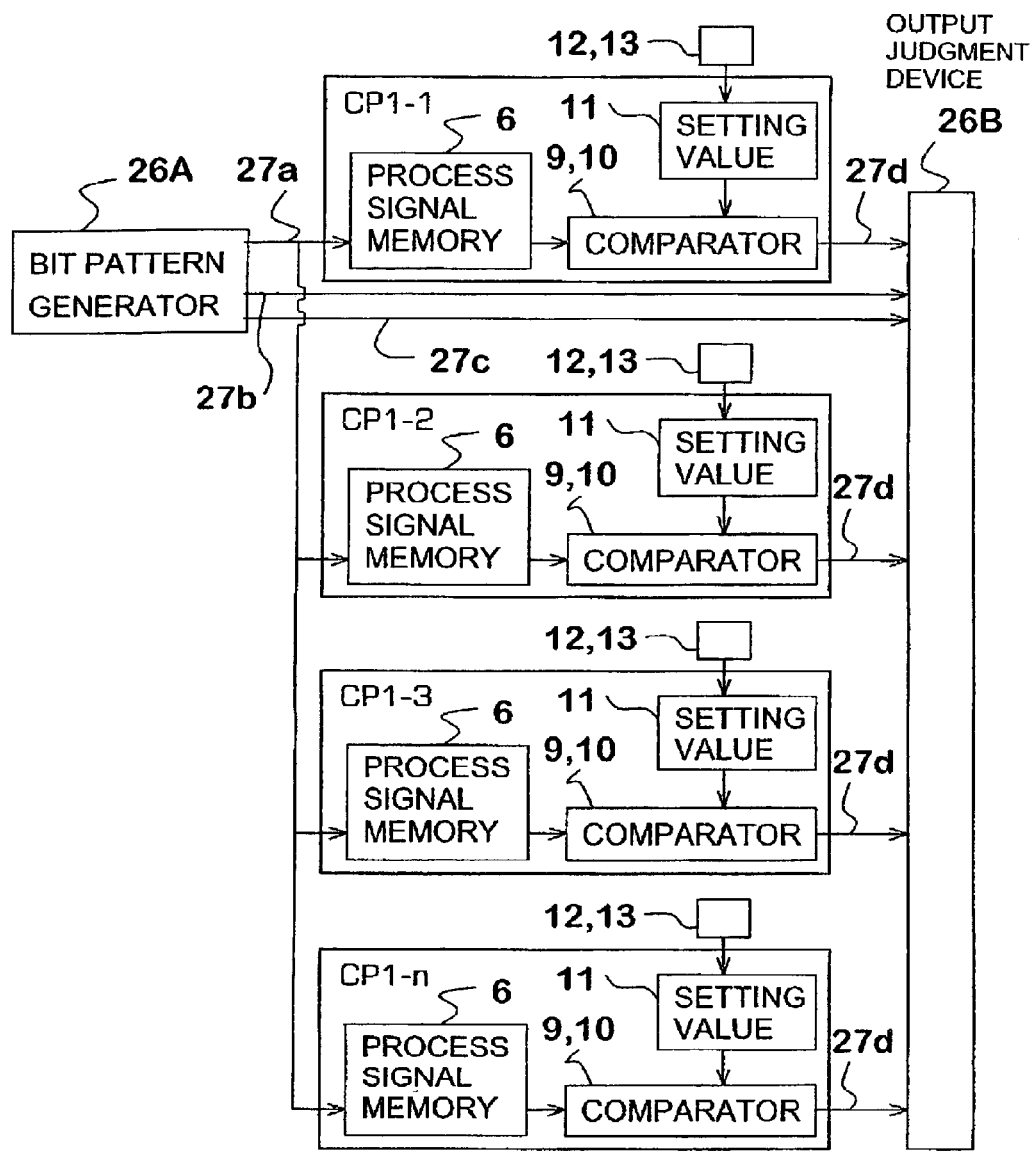
FIG. 3 is a system diagram depicting a test design for confirming operation of the plant instrumentation equipment of the first embodiment in this invention.

For this reason, in this embodiment, as shown in FIG. 3, logical integrated circuits are dispersed in each process signal, and a bit pattern output device 26A and a output judgment device 26B are connected to an input side and an output side of each logical integrated circuit, respectively, as test facilities. FIG. 3 shows one system of logical integrated circuit and omits illustration of the upper limit adjuster 8A and the lower limit adjuster 8B included in each set value comparator. The bit pattern output device 26A arranged in an input side of the test facilities outputs bit patterns 27a with raising one sequentially, and then, an output pattern 27b and a time-sharing signal 27c is sent to the output judgment device 26B. The output judgment device 26 receives these signals and output signals 27d from respective logical integrated circuits CP1-1, ..., CP1-n, and judges acceptability. By dividing the logical integrated circuits in response to respective process signals, the number of inputted patterns is decreased, and further by inputting the signals simultaneously, the number of signal patterns of a plurality of process signals can be decreased.

Since the circuit board 22 includes all of process treatment functions, the equipment can be downsized and the space savings enables arranging multiplexed circuit boards, and, thus, equipment having high reliability can be manufactured of a size about the same as, or less than, the size of the conventional control equipment. Moreover, by constituting instrumentation circuits with logic blocks and wiring connection thereof, without using software, it is unnecessary to perform the verification and validation when applying these instrumentation circuits to safety protection system of, for example, a nuclear power plant.

Therefore, if each of the logical integrated circuits is arranged for every process signal logically and electrically independent of each other, and mounted on the control board 22, mutual influence decreases and huge input patterns of test signals can be decreased. Additionally, if the logic of processing these process signals and the set value comparators are the same except set values, test process signals can be inputted simultaneously and in parallel with each other, and moreover, by inputting the operation signals 15 in parallel with each other for every process, respective logical integrated circuit can be tested simultaneously and thereby the test for checking operations can be shortened.

In the tripled configuration shown in FIG. 2, when the one logical integrated circuit constituting the set value comparator fails and an erroneous signal is outputted from the relevant logical integrated circuit, the operation of the relevant logical integrated circuit is alerted, however, the remaining two logical integrated circuits used to process the same process signal as the failed logical integrated circuit are normal, the majority judgment by the majority judgment circuit 23 does not output an operation signal as a collective decision of the plant protection instrumentation equipment 20, and the plant operation can be kept. Consequently, in this case, no operation signal from the plant protection instrumentation equipment 20 to devices or senior logical judgment devices thereof is outputted.

In the tripled configuration shown in FIG. 2, when one logical integrated circuit constituting a set value comparator fails, maintenance work such as repair or exchange of the logical integrated circuit is necessary. When two residual logical integrated circuits of the tripled configuration for processing one process signal with which the failed logical integrated circuit dealt, after shutting off the power supply of the control board 22 including the failed logical integrated circuit and drawing the control board 22 out of a storage chassis of the plant protective instrumentation equipment, the plant protective instrumentation equipment as a whole does not output an operation output and the plant operation can be sustained. Consequently, even in the maintenance work, the operation signal 15 is not outputted from the plant protective instrumentation equipment to devices or logical judgment device in the rank higher than this equipment.

Furthermore, logical integrated circuits, each of which on each control board differs in manufacturers or in its manufacture process and/or has different logical conversion circuits from each other, may be applied to the logical integrated circuits constituting set value comparators in the tripled configuration shown in FIG. 2. In this case, with differentiating at least one design factor of the logical integrated circuits, when a failure occurs, which may be common in the logic circuits and has potentially contained in design circuits in manufacture processes, the operation of the corresponding logical integrated circuit is alerted, however, the two residual control boards 22 of the tripled configuration for processing the same signals as the failed circuit have no common failure factors. Thus the operation output can continue because of the majority judgment of the majority judgment circuit 23, thereby the plant operation can be sustained. Consequently, the operation signal 15 is not outputted from this instrumentation equipment to devices or logical judgment device in the rank higher than this equipment.

In addition, if there occurs a failure in the above-mentioned logical integrated circuit or the maintenance work such as exchange of the failed logical integrated circuit is performed, even when the failure of the logical integrated circuit is occurred in an incorrect operation side or a suspend side and thus the signal is not outputted, as far as the logical integrated circuits of the residual control boards of the tripled configuration are sound, the majority judgment circuits 23 judges along with the majority selection, and may output an operation signal 15 to devices or the logical judgment device in the rank higher than this instrumentation equipment in accordance with actual process variation.

Second Embodiment

Figure 4:
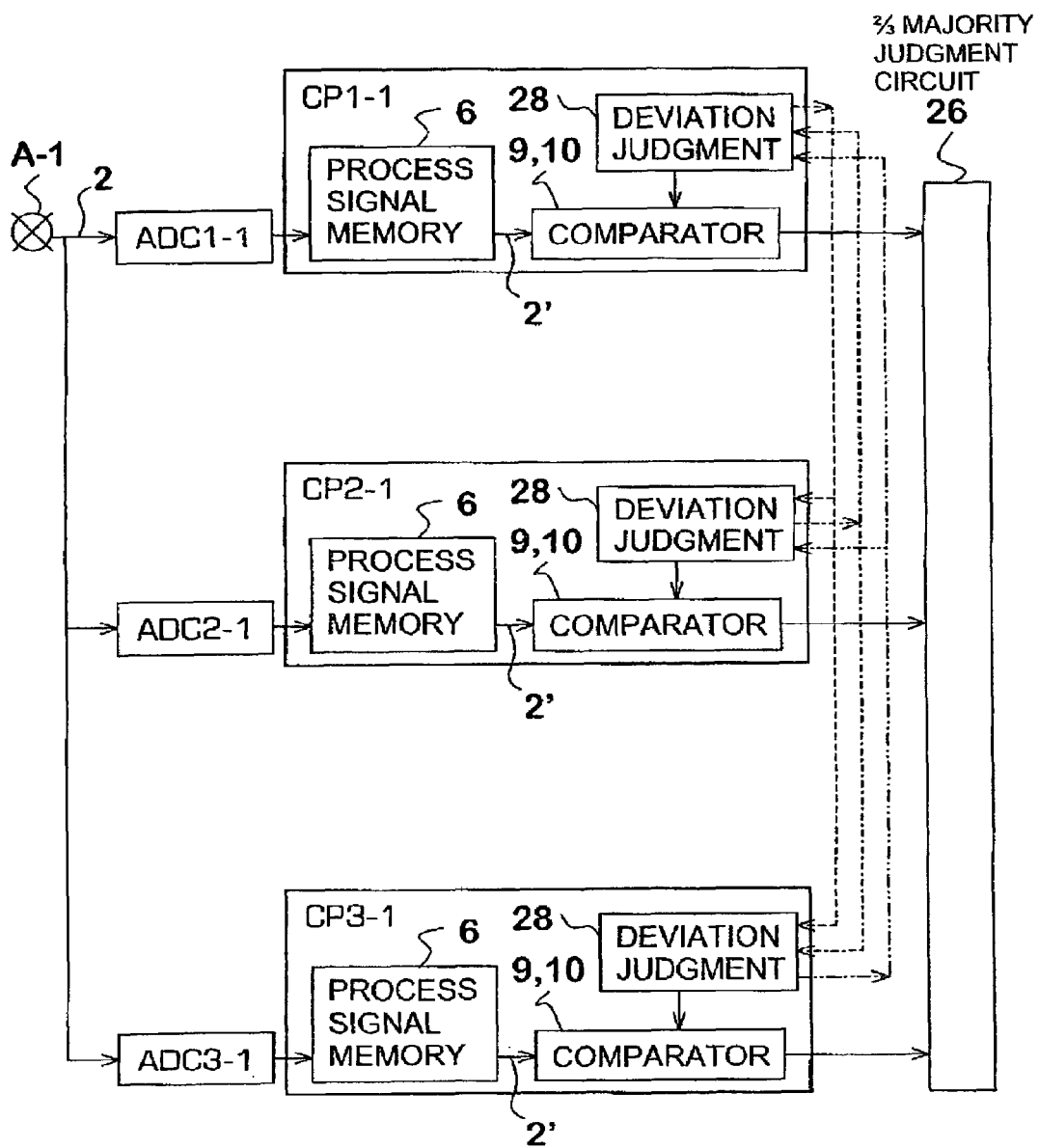
FIG. 4 is a system diagram of plant protection instrumentation equipment of a second embodiment in this invention.

Next, a second embodiment of this invention is explained, where common structure as in the first embodiment contains the same reference number and the detailed explanation thereof is omitted. Here, one process signal is processed by three A/D converters and three set value comparators in the tripled configuration, and judged by the majority judgment circuit along with the majority selection. In this embodiment shown in FIG. 4, one process signal outputted from one sensor A-1 is inputted to tripled A/D converters ADC1-1, ADC2-1, ADC3-1, each of which comprises logical integrated circuits and converts the process signal into a digital signal independently of each other, and the converted digital signal is inputted through a corresponding process signal memory 6 of one of the three set value comparators CP-1, CP-2, CP-3, into a set value comparison portion 10 of the corresponding one of three digital value comparators. Here, only circuits for processing process corresponding to the sensor A1 of the plant protective instrumentation equipment shown in FIG. 2 are shown representatively in FIG. 4.

In this embodiment, each set value comparator has deviation judgment circuit 28 in addition to the set value comparison portion 10. Namely, the set value comparison portion 10 receives the process signal 2 and outputs a digital count number of the process signal 2 into another setting comparator of the tripled configuration. Each deviation judgment circuit 28 of the set value comparator also receives two digital count numbers, corresponding to the process signal 2 from the other two set value comparators, and computes a deviation of inputted values. That is, the deviation judgment circuit 28 calculates a deviation between a value stored in the process signal memory in the same set value comparator and the values inputted from residual systems. When the calculated deviation exceeds a deviation set value, the deviation judgment signal judges that the set value comparator is abnormal and outputs an abnormal judgment output 29 to alert the deviation abnormality.

According to this embodiment, a test of operation confirmation of the logical integrated circuit in operating of the plant is performed with respect to each of processes of the tripled control board 22, that is, each logical integrated circuit, sequentially. Here, when all tripled control board 22 is normal, one value of one process signal thereof is changes into a value exceeding the set value as a test, and each of the control board 22 is forced to output an operation signal. In this case, an operation of one system of the control board 22 is alerted, however, tripled circuits in a residual side is normal and thereby the operation can be sustained based on the residual two outputs of control circuits along with two out of two logic, instead of two out of three logic. In this case, a test process signal is inputted by changing a changeover switch for the test into a test side 3B, shown in FIG. 1, and connecting a terminal of the A/D converter 4 to the voltage generator 17, so that a single process operation signal of a single board is outputted as long as the voltage is made to exceed a voltage value corresponding to the set value.

Moreover, if a deviation of two values of the control boards 22 multiplexed with respect to each process is monitored as for digital signals inputted into the control boards 22 and converted from the analog signal, the soundness of the logical integrated circuits without self-diagnostic function can be notified in advance before the equipment as a whole falls into an error operation side, a malfunction side, or an inoperative side.

Third Embodiment

Figure 5:
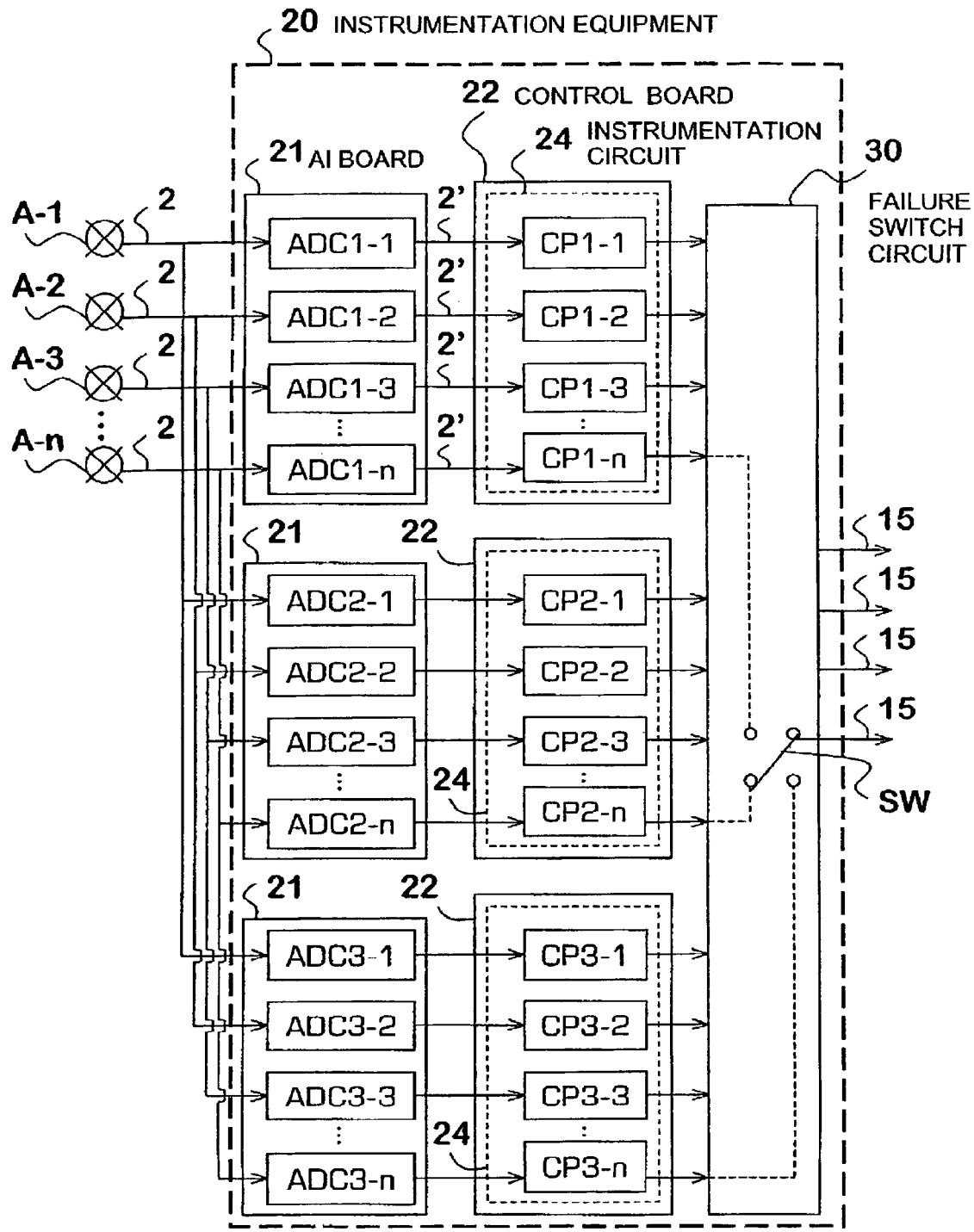
FIG. 5 is a system diagram of plant protection instrumentation equipment of a third embodiment in this invention.

Next, a third embodiment of this invention is explained, where common structure as in the first embodiment contains the same reference number and the detailed explanation thereof is omitted. As shown in FIG. 5, in this embodiment, instrumentation circuits are tripled with adopting a configuration that when a failure is detected in a priority circuit, a switch will select a normal operating instrumentation circuit. This instrumentation equipment is composed of sensors A-1, . . . , A-n, for detecting plant status quantities, A/D converters ADC1-1, . . . , ADC1-n, for converting inputted analog signals into digital signals, set value comparators CP1-1, . . . , CP1-n, CP2-1, . . . , CP2-n, CP3-1, . . . , CP3-n, each of which compares corresponding one of inputted digital signals with a set value and outputs an operation signal when the digital signal exceeds the set value, and a failure changeover circuit 30 for changing an output among signals inputted from three systems of tripled configuration in case of the failure. The tripled systems perform calculation of processes simultaneously and independently of each other. Ordinary, in a trip judgment according to an output from the sensor A-n, a changeover switch SW of the failure changeover circuit 30 is set in a set value comparator CP2-n side as output selection. In this changeover of the output selection, an output signal from the failure changeover circuit 30 is changed into a side of a normal operating instrumentation circuit as long as abnormality of at least one logical integrated circuits is detected in accordance with judgment based on comparison of a lower limit and an upper limit after inputting the process signal by the priority circuit or a derivation of process signal values. According to the above-mentioned constitution, a number of components, such as auxiliary relays, can be decreased compared with the majority judgment circuit based on two out of three judgment.

Fourth Embodiment

Figure 6:
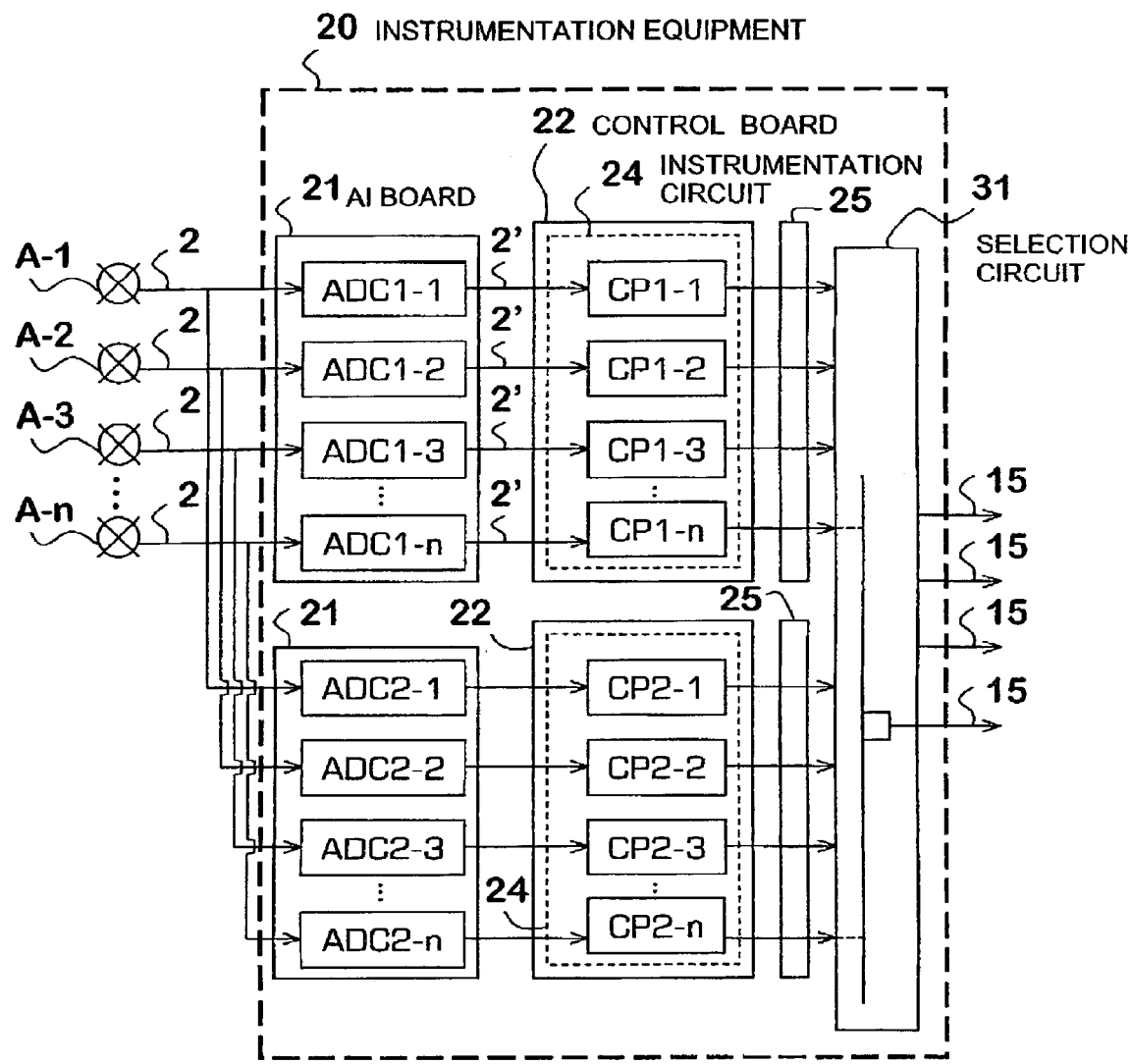
FIG. 6 is a system diagram of plant protection instrumentation equipment of a fourth embodiment in this invention.

Next, a fourth embodiment of this invention is explained, where common structure as in the first embodiment contains the same reference number and the detailed explanation thereof is omitted. As shown in FIG. 6, in this embodiment, instrumentation circuits are doubled with a judgment circuit based on two out of two judgment. This instrumentation equipment is composed of sensors A-1, . . . , A-n, for detecting plant status quantities, A/D converters ADC1-1, . . . , ADC1-n, ADC2-1, . . . , ADC2-n, for converting inputted analog signals into digital signals, set value comparators CP1-1, . . . , CP1-n, CP2-1, . . . , CP2-n, each of which compares corresponding one of inputted digital signals with a set value and outputs a signal when the digital signal exceeds the set value, and a selection circuit 31 for outputting operation signals 15 with respect to each process based on AND judgment from signals outputted from the two sets.

It is possible that the selection circuit 31 shown in FIG. 6 is arranged to OR judgment, that is, as a first modified example of this embodiment, in which instrumentation circuits are doubled and the judgment circuit is based on one out of two logic. This instrumentation equipment in this example is composed of sensors A1, . . . , A-n, for detecting plant status quantities, A/D converters ADC 1-1, . . . , ADC 1-n, ADC2-1, . . . , ADC2-n, for converting inputted analog signals into digital signals, set value comparators CP1-1, . . . , CP1-n, CP2-1, . . . , CP2-n, each of which compares corresponding one of inputted digital signals with a set value and outputs a signal when the digital signal exceeds the set value, and a selection circuit 31 for outputting operation signals 15 with respect to each process based on OR judgment from signals outputted from the two sets.

It is also possible that the selection circuit 31 shown in FIG. 6 is replaced with a failure changeover circuit 30 with a changeover switch SW shown in FIG. 5, that is, as a second modified example of this embodiment shown in FIG. 6, in which instrumentation circuits are doubled and changeover configuration that switches into a side of a normal operating instrumentation circuit when the failure is detected in a priority circuit. This instrumentation equipment in this example is composed of sensors A-1, . . . , A-n, for detecting plant status quantities, A/D converters ADC1-1, . . . , ADC1-n, ADC2-1, . . . , ADC2-n, for converting inputted analog signals into digital signals, set value comparators CP1-1, . . . , CP1-n, CP2-1, . . . , CP2-n, each of which compares corresponding one of inputted digital signals with a predetermined set value and outputs a signal when the digital signal exceeds the set value, and a failure changeover circuit 30 for changing an output signal of this doubled system by the changeover switch SW when the failure is detected.

When the instrumentation circuits are in doubled configuration as mentioned above, an analogous effect as in the tripled configuration can be attained by performing judgment of output signals of the doubled systems by means of the selection circuit 31 or the failure changeover circuit 30.

Fifth Embodiment

Next, a fifth embodiment of this invention, applied to a radiation measurement device of a digital signal processing type of a nuclear power plant is explained. A radiation measurement device related to a safety protection system provides information for isolating an area in which radiation dosage is relatively high or for activating a standby gas treatment system to each of operation circuits, so as to prevent radioactive ingredients from leaking out of the plant when the radiation dosage increases due to some reason.

Figure 7:
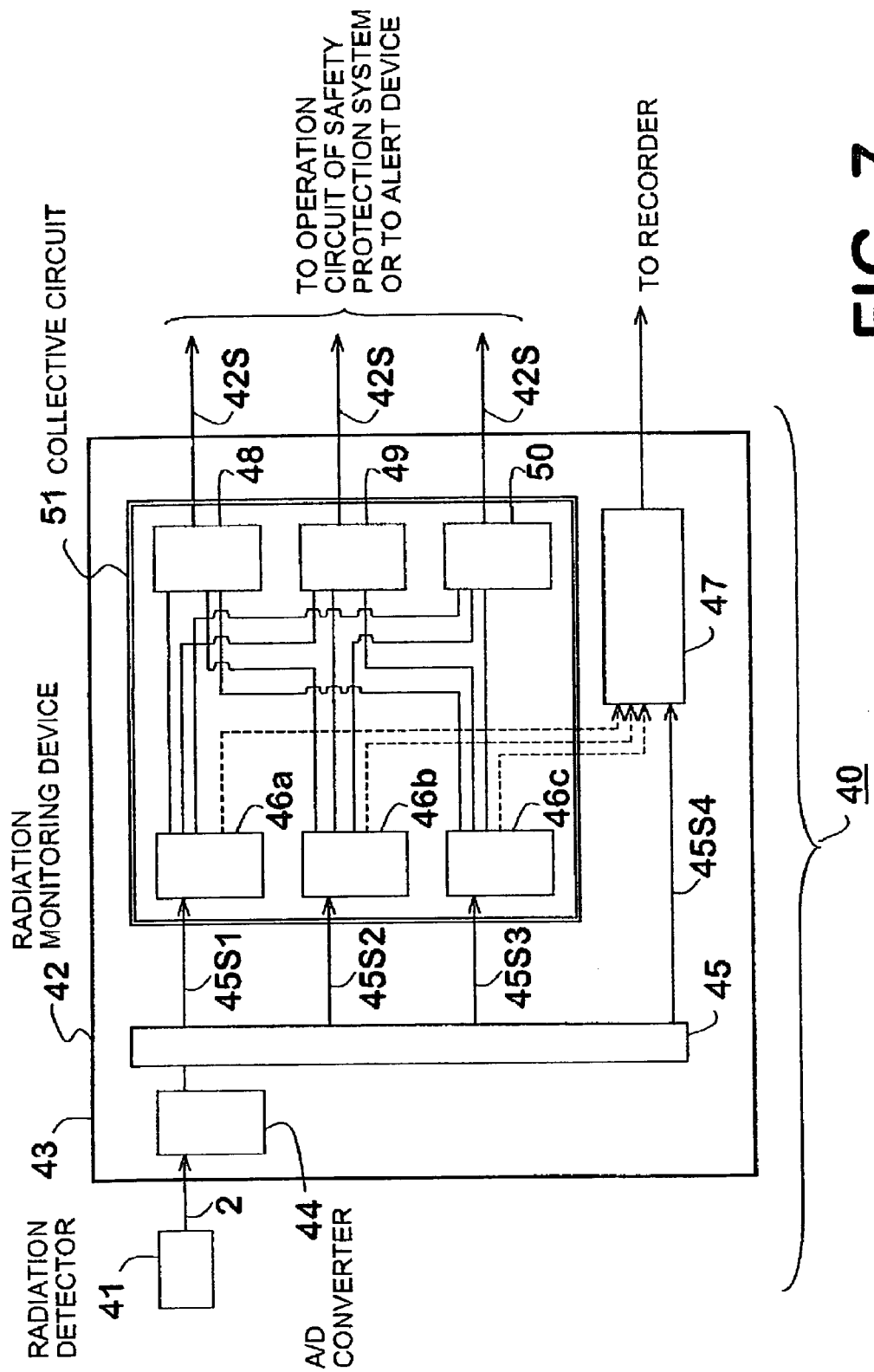
FIG. 7 is a block diagram of plant protection instrumentation equipment applied to a radiation measurement device of a fifth embodiment in this invention.

As shown in FIG. 7, this radiation measurement device 40 is composed of a radiation detector 41, and a radiation monitoring device 42 for monitoring a process signal inputted from the radiation detector 41 and outputting radiation information 42S to an operation circuit of the safety protection system, an alarm device or a recorder. A processing circuit 43, installed in the radiation monitoring device 42, for processing the process signal 2 inputted from the radiation detector 41 is composed of an A/D converter 44, a signal branch circuit 45, three radiation signal processing circuits 46a, 46b, 46c, arranged in multiplexed configuration, majority judgment circuits 48, 49, 50, and one radiation signal processing collective circuit 47 for instrumentation control. Alternatively, according to arrangement of radiation detector 41 and the radiation monitoring device 42 in this construction, the A/D converter 44 may be arranged near the radiation detector 41 as independent of other circuits, or may be arranged as one device integrated with the radiation detector 41.

Next, contents of signal processing are explained. A process signal 2 corresponding to radiation dosage detected by the radiation detector 41 is inputted into a radiation monitoring device 42. The A/D converter 44 in the radiation monitoring device 42 converts the process signal from the radiation detector 41 into a digital signal, and this digital signal is branched into three signals 45S1, 45S2, 45S3 for the safety protection system and one signal 45S4 for instrumentation control system. Here, the signal 45S4 for the instrumentation control system is isolated from the safety protection system by the signal branch circuit 45 so as not to cause deactivation of the function of the safety protection system.

The signals 45S1, 45S2, 45S3 for the safety protection system are inputted into three radiation signal processing circuits 46a, 46b, 46c, respectively, for the safety protection system, and a radiation processing portion in each of the radiation signal processing circuits 46a, 46b, 46c calculates for conversion to radiation dosage, that is, performs radiation processing. A trip judgment portion of each radiation signal processing circuits judges status such as "high radioactive", "extremely high radioactive" and "under lower limit", that is, processes trip judgment. As for this trip judgment, when the radiation dosage calculated by the radiation processing calculation is increased more than a predetermined value, which is a high radioactive set value or an extremely high radioactive set value, which is set higher than the high radioactive value, the abnormality condition of the radiation dosage, such as "high radioactive state" or "extremely high radioactive state", is outputted to an alarm device installed outside the radiation monitoring device 42, and when the radiation dosage is decreased less than a predetermined value called a lower limit set value, this status in which the radiation dosage is not within a measurement possible range is outputted into the external alarm device.

Here, the radiation signal processing circuits 46a, 46b, 46c for the safety protection system are constituted by logical integrated circuit, such as programmable logic devices (PLD), constituted by hardware wiring, with transforming digital signal processing function into logical circuit configuration. In the logical integrated circuit used for each of the radiation signal processing circuits 46a, 46b, and 46c, a logical conversion circuit or a wiring means between logic circuits is different from each other, namely, each of the radiation signal processing circuits 46a, 46b, and 46c, has hardware configuration different from each other.

The results of "high radioactive" judgment of three radiation signal processing circuits 46a, 46b, 46c for the safety protection systems are inputted into a "high radioactive" majority judgment circuit 48, and if two or three of three judgment results are in "high radioactive" status, the "high radioactive" majority judgment circuit 48 outputs "high radioactive" ON status information into devices outside the radiation monitoring device 42 as a signal 42S. And the results of "extremely high radioactive" judgment or "lower limit" judgment is treated the same manner of the "high radioactive" majority judgment by an "extremely high radioactive" majority judgment circuit 49 or a "lower limit" majority judgment circuit 50, respectively. Thus, these majority circuits 48, 49, 50 enable to output normal calculation results of radiation signals even if one logic of the three processing circuits 46a, 46b, 46c is in an abnormal state.

The signal 45S4 for instrumentation control system is inputted into the radiation signal processing collective circuit 47, and processed in radiation calculation, analog output processing, and display processing, and thus a processed signal is outputted to, for example, a recorder or a display. Additionally, shown as a dashed line in FIG. 9, signals outputted from the radiation signal processing circuits 46a, 46b, 46c are also inputted into a radiation signal processing collective circuit 47 for the instrumentation control system and processed in essentially the same manner as mentioned above. Since the radiation signal processing collective circuit 47 for the instrumentation control system is not related to the function of the safety protection system, and thereby it does not affect workload of the verification and validation, the signal processing function thereof can be realized by microprocessor CPU toward a plurality of radiation detectors, in a conventional manner, or alternatively realized by elemental devices such as PLD.

Figure 8:
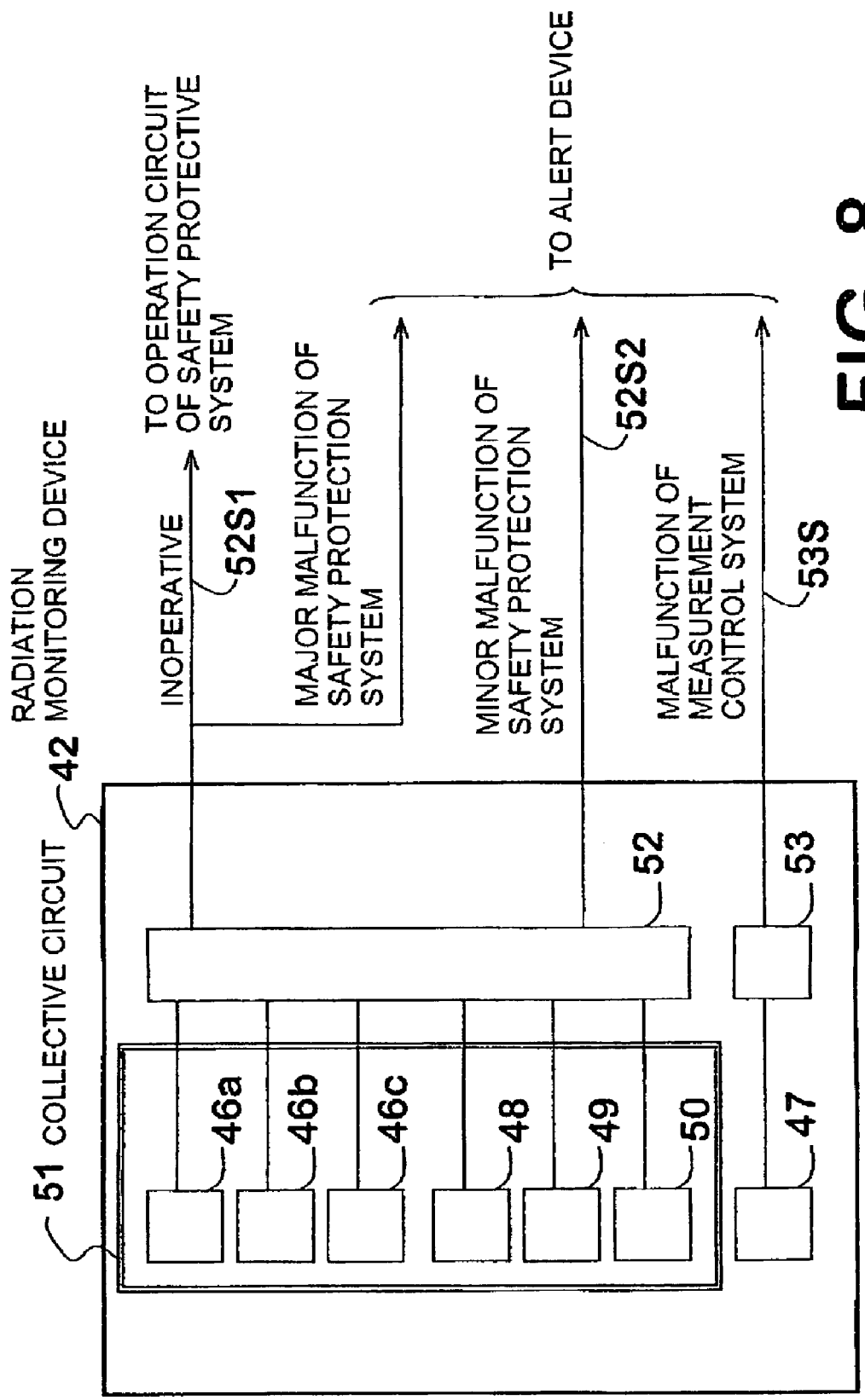
FIG. 8 is a block diagram showing a failure detection circuit of plant protection instrumentation equipment applied to a radiation measurement device of a fifth embodiment in this invention.

Next, the configuration of the radiation signal processing collective circuit 47 for the instrumentation control system and a radiation signal processing collective circuit 51 including three radiation signal processing circuits 46a, 46b, 46c, for the safety protection system is explained with reference to FIG. 8. The radiation signal processing collective circuit shown in FIG. 8 comprises a radiation signal processing collective circuit 51 for the safety protection system, a circuit-failure detection circuit 52 for the safety protection system, a radiation signal processing collective circuit 47 for the instrumentation control system, and a circuit-failure detection circuit 53 for the instrumentation control system.

The circuit-failure detection circuit 52 for the safety protection system monitors operating status of the three radiation signal processing circuits 46a, 46b, 46c and the majority selection circuits 48, 49, 50, included in the radiation signal processing collective circuit 51 for the safety protection system.

When the circuit-failure detection circuit 52 for the safety protection system detects status that at most one radiation signal processing circuit is normal, or detects a failure of the majority selection circuit for outputting to the safety protection system, such that the multiplex function of the safety protection system can not be assured, the circuit-failure detection circuit 52 judges this condition as "major malfunction of the safety protection system" and outputs an "inoperative" signal 52S1 into an external operation circuit of the safety protection system and the judgment result as the "major malfunction of the safety protection system" into an external alarm device. On the other hand, when the circuit-failure detection circuit 52 for the safety protection system detects status that only one radiation signal processing circuit has failed and at least two radiation signal processing circuits are operational, such that the multiplex function of the safety protection system is assured, the circuit-failure detection circuit 52 judges this condition as "minor malfunction of the safety protection system" and outputs the judgment result as the "major malfunction of the safety protection system" into an external alarm device, without outputting an inoperative signal into an external operation circuit of the safety protection system. According to this configuration, with multiple signal processing circuits for the safety function, certain detection patterns of failure of signal processing circuits are assumed as a failure not concerned with the safety function, and then the safety function can be continued.

The circuit-failure detection circuit 53 for the measurement control system monitors operation status of the radiation signal processing collective circuit 47 for the measurement control system, and outputs a "malfunction of the measurement control system" signal 53S into an exterior alert device upon detection of a failure of the radiation signal processing collective circuit 47 for the measurement control system. Since neither "the minor malfunction of the safety protection system" nor "the malfunction of the measurement control system" indicates a loss of function of the safety protection system, these signals may be included as a part of a minor malfunction of the radiation monitoring device signal to be outputted to the exterior alert device. Thus, a second radiation signal processing collective circuit for function other than the safety function, arranged apart from a first radiation signal processing collective circuit for safety function, for which high reliability is necessary, enables simplification of the signal processing for the safety function. Moreover, with multiple signal processing circuits for the safety function, the signal 53 is outputted to notify a failure state of the radiation signal processing circuit 47 for the instrumentation control. This configuration informs an operator that the safety function can be retained but a part of signal processing circuits has failed, and the operator can perform a suitable response.

According to this embodiment, the radiation monitoring system 42 as a part of plant protective instrumentation equipment can be functionally divided into a portion concerning the safety protection system and a portion concerning the measurement control system. The former portion is constituted by applying three or more systems of the radiation signal processing circuits 46a, 46b, 46c, each including a logical conversion circuit made by different means from each other, and applying the output judgment of trip status by the majority judgment circuits 48, 49, 50. The multiplicity of the radiation signal processing function can be attained and the failure based on common factors can be prevented. And as far as the multiplicity is attained, a trip signal is not outputted and only the alarm is outputted into the operation circuit of the safety protection system even if a part of the signal processing function fails, and thereby the influence to the reliability of plant operation can be reduced.

Sixth Embodiment

Figure 9:
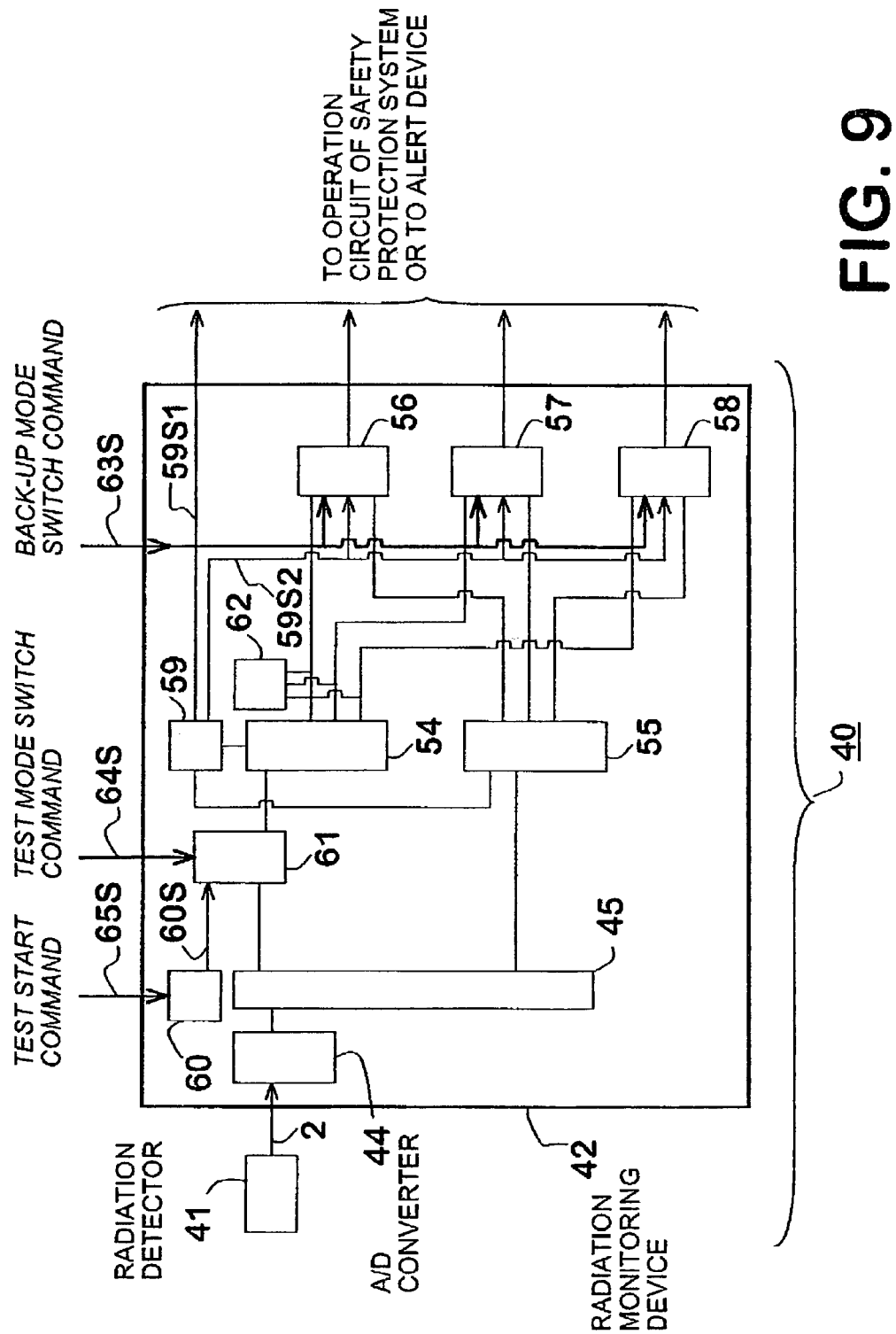
FIG. 9 is a block diagram of plant protection instrumentation equipment applied to a radiation measurement device of a sixth embodiment in this invention.

Next, a sixth embodiment of this invention, applied to a radiation measurement device is explained with reference to FIG. 9. A radiation measurement device 42 shown in FIG. 9 is composed of an A/D converter 44, a signal branch circuit 45, a regular radiation signal processing circuit 54, a backup radiation signal processing circuit 55, a radiation signal processing circuit failure detection circuit 59, a "high radioactive" signal processing selection circuit 56, an "extremely high radioactive" signal processing selection circuit 57, a "lower limit" signal processing selection circuit 58, a signal generation circuit 60, an input signal switch circuit 61, and a signal processing result display circuit 62.

In this embodiment, process from the radiation detector 41 to the signal branch circuit 45 is the same as in the fifth embodiment. The digital signals branched by the signal branch circuit 45 are inputted into the regular radiation signal processing circuit 54 and the backup radiation signal processing circuit 55, respectively, and conversion calculation to the radiation dosage is performed in each radiation signal processing circuit. A trip judgment portion of each radiation signal processing circuit judges "high radioactive", "extremely high radioactive" and "lower limit", and the result of this judgment is sent to the signal processing selection circuits 56, 57, 58. Here, the regular radiation signal processing circuit 54 includes a logical integrated circuit with a logical conversion circuit that is different from that of the backup radiation signal processing circuit 55.

The radiation signal processing circuit-failure detection circuit 59 monitors operation status of the regular radiation signal processing circuit 54 and the backup radiation signal processing circuit 55, and outputs a command to select a signal processing result of the usual radiation signal processing circuit 54 toward the signal processing selection circuit 56, 57, 58 if the usual radiation signal processing circuit 54 is normally operating. The circuit-failure detection circuit 59 outputs a command to select a signal processing signal of the backup radiation signal processing circuit 55 toward the signal processing selection circuit 56, 57, 58 if the regular radiation signal processing circuit 54 is in an abnormal state and the backup radiation signal processing circuit 55 is normally operating. Moreover, when the radiation signal processing circuit failure detection circuit 59 detects that both the regular radiation signal processing circuit 54 and the backup radiation signal processing circuit 55 are abnormal, it outputs an "inoperative" signal into an exterior operation circuit of the safety protection system and a "major malfunction of the safety protection system" is sent to an exterior alert device.

The "high radioactive" signal processing selection circuit 56 outputs a "high radioactive" judgment result judged by the backup radiation signal processing circuit 55 into an exterior device outside the radiation monitoring device 42 if a "backup mode switching command" signal 63S for switching to a backup mode is inputted from an exterior of the radiation monitoring device 42 or a backup radiation signal processing signal selection command 59S2 for selecting the backup radiation signal processing circuit is sent by the radiation signal processing circuit failure detection circuit 59. And the "high radioactive" signal processing selection circuit 56 outputs a "high radioactive" judgment result judged by the regular radiation signal processing circuit 54 into an exterior device outside the radiation monitoring device 42 if neither the backup mode switching command signal 63S for switching to a backup mode from an exterior of the radiation monitoring device 42 nor the backup radiation signal processing signal selection command 59S2 for selecting the backup radiation signal processing circuit is inputted. The "extremely high radioactivity" signal processing selection circuit 57 and the "lower limit" signal processing selection circuit 58 operate in an analogous fashion, respectively.

When the "backup mode switching command" 63S is inputted and further the "test mode switching command" signal 64S is inputted from an exterior device, the input signal switch circuit 61 switches the signal toward the regular radiation signal processing circuit 54 from the branched signal outputted from the signal branch circuit 45 to a test signal 60S generated by the signal generation circuit 60. In this case, when "test start command" signal 65S is inputted from an exterior device into the signal generation circuit 60, the signal generation circuit 60 starts to output the test signal 60S.

The test signal 60S is inputted into the regular radiation signal processing circuit 54 and the signal processing result thereof is outputted to, and is displayed on, the signal processing result display circuit 62. According to this embodiment equipped with the backup radiation signal processing circuit 54 having a logical circuit made by means different from one applied to the usual radiation signal processing circuit 54, the multiplicity of the radiation signal processing function can be attained and failure based on the common factors can be prevented. Moreover, by switching into the backup mode, operation test of the regular radiation signal processing circuit can be performed without ceasing the safety protection function of the radiation monitoring device in operating of the plant.

Seventh Embodiment

Figure 10:
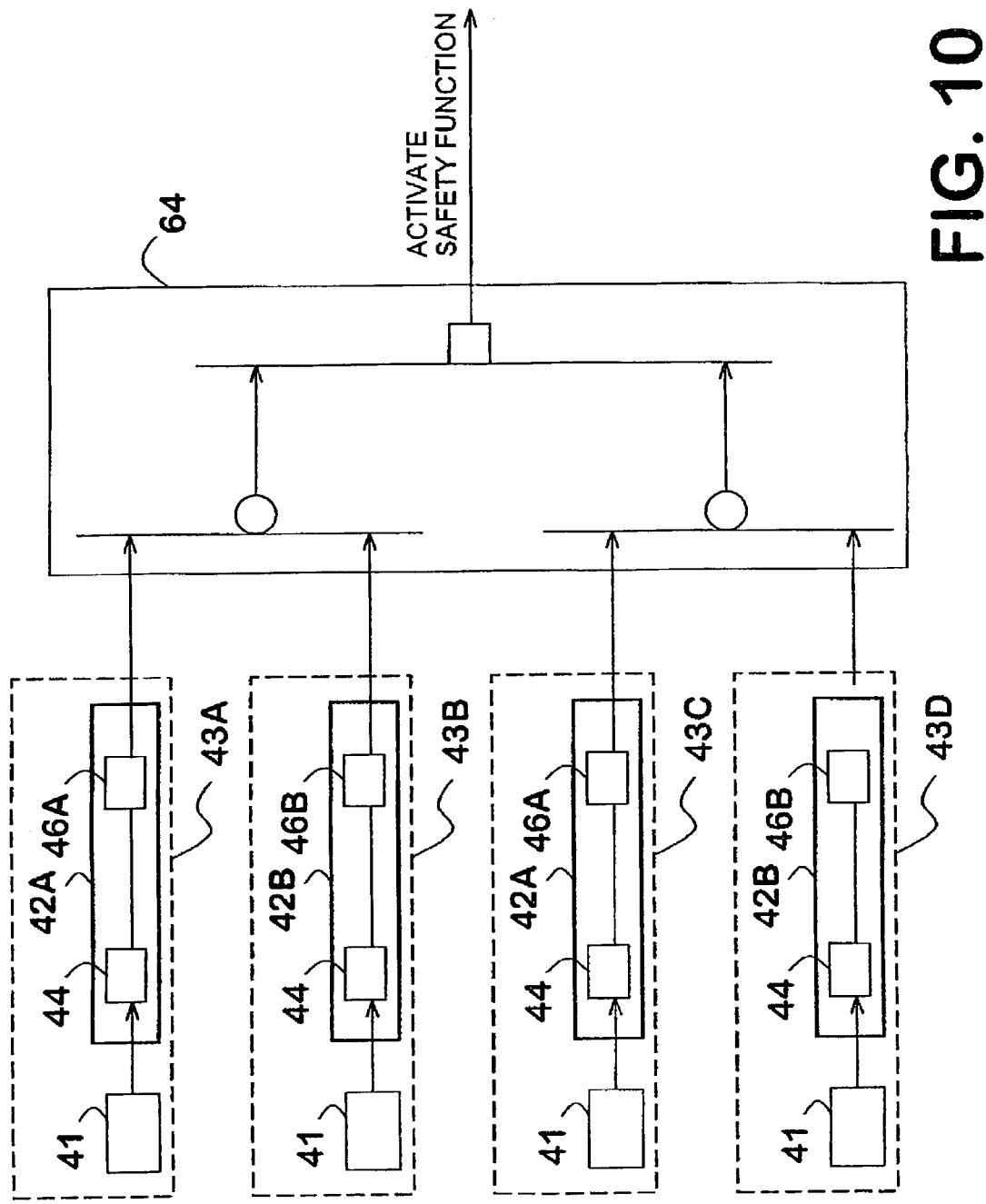
FIG. 10 is a block diagram showing an operation circuit of a safety protection system of plant protection instrumentation equipment applied to a radiation measurement device of a seventh embodiment in this invention.
Figure 11:
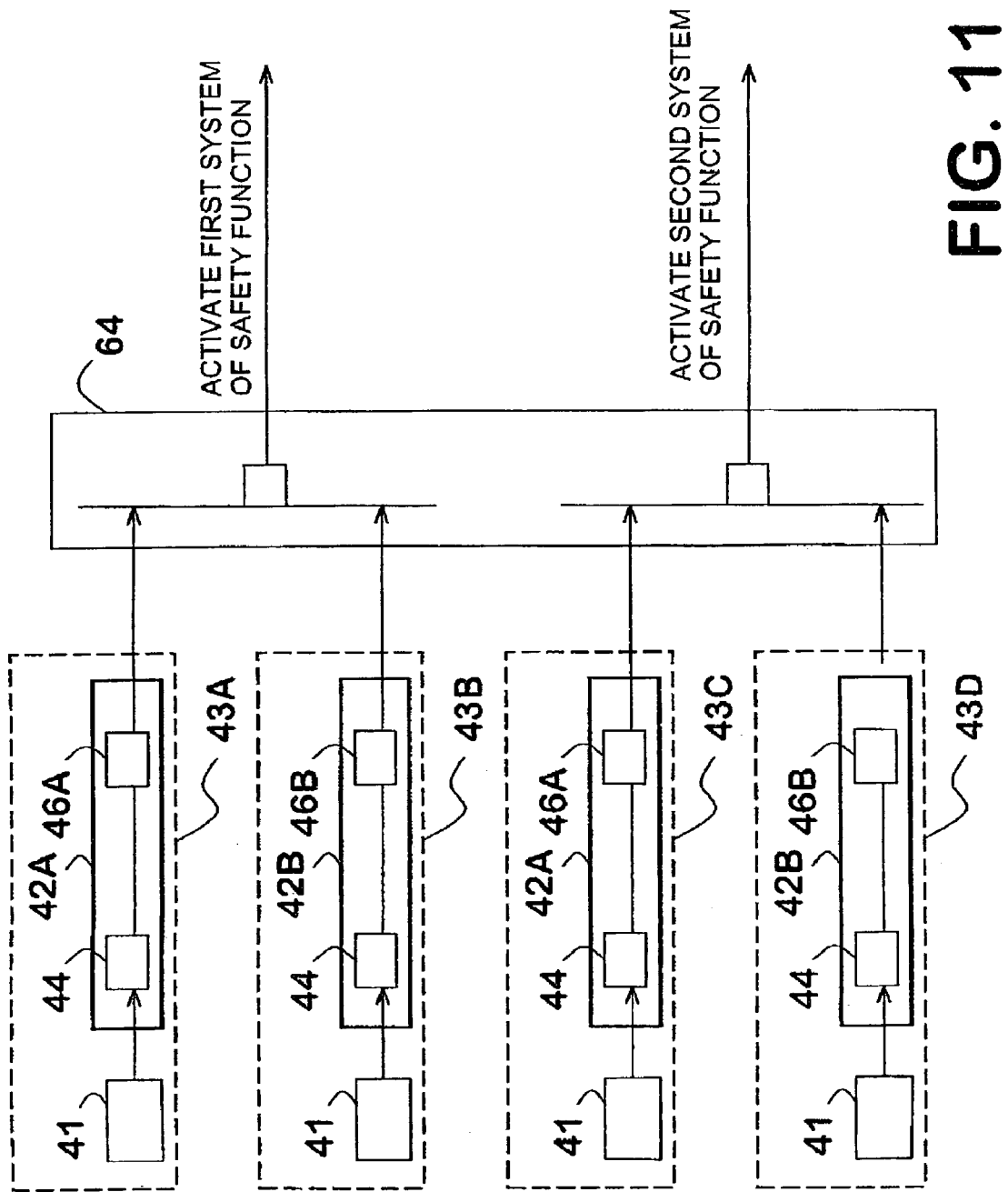
FIG. 11 is a system diagram showing a first modified example of plant protection instrumentation equipment applied to a radiation measurement device of a seventh embodiment in this invention.
Figure 12:
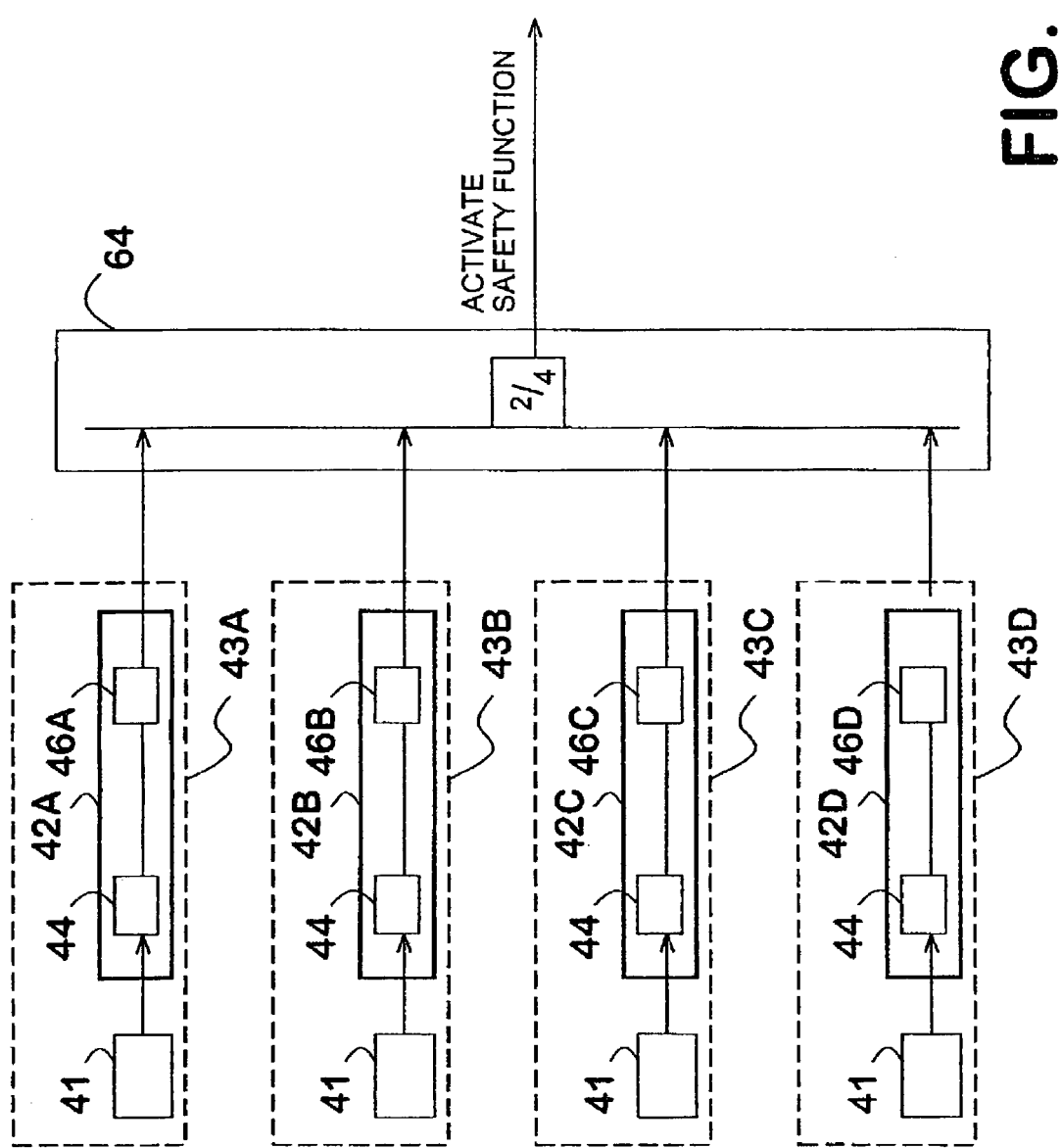
FIG. 12 is a system diagram showing a second modified example of plant protection instrumentation equipment applied to a radiation measurement device of a seventh embodiment in this invention.
Figure 13:
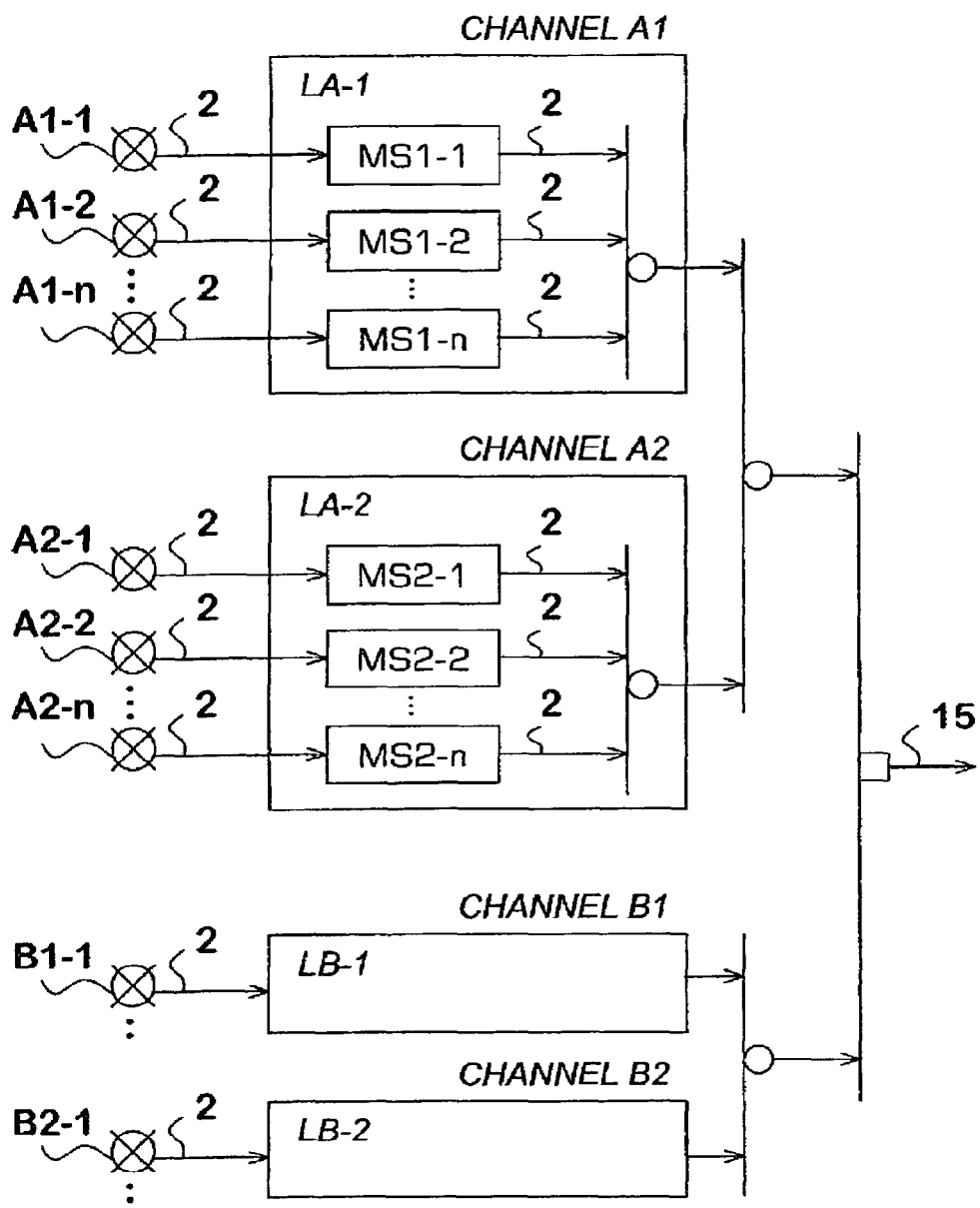
FIG. 13 is a system diagram of conventional plant protection instrumentation equipment.

Next, a seventh embodiment of this invention, applied to radiation measurement device, especially concerned with the first embodiment, is explained with referring FIGS. 10 to 12. FIG. 10 shows a configuration of radiation measurement system and a safety protection system operation circuit 64 with applying doubled "one out of two" logic to the operation circuit of the safety protection system. The radiation measurement system shown in FIG. 10 is composed of four pairs of radiation measurement devices 43A, 43B, 43C, 43D, which are constituted by combining the radiation detectors 41, 41, 41, 41 and the radiation monitoring devices 42A, 42B, 42A, 42B, respectively, and the radiation monitoring devices 42A, 42B are equipped with radiation signal processing circuits 46A, 46B, for the safety protection system, respectively. Here, the two radiation monitoring devices 42, 42B have different logical conversion circuits constituting the corresponding integrated circuits, and FIG. 12 shows the configuration of the two different kinds of radiation monitoring devices 42A, 42B applied to the respective radiation measurement devices 43A, 43B, 43C, 43D.

The process from the radiation detector 41 to the A/D converter 44 in this embodiment is the same as one in the fifth embodiment. In this embodiment, each digital signal converted by the A/D converter 44 is directly inputted into the corresponding one of the radiation signal processing circuits 46A, 46B, 46A, 46B, and radiation calculation processing portions of the radiation signal processing circuits 46A, 46B converts the signal into radiation dosages, and the corresponding trip judgment processing portion thereof judges "high radioactive", "extremely high radioactive" and "lower limit", and each of the judgment result is directly outputted toward the safety protection system operating circuit 64. The safety protection system operating circuit 64 receives "extremely high radioactive" inputs from the radiation measurement devices 43A, 43B, 43C, 43D. The results of radiation measurement devices 43A and 43B are ORed together, as are the results of the radiation measurement devices 43C and 43D. Those results are then ANDed together. The safety protection system operating circuit 64 operates the safety function based on a double "one out of two" logic.

FIG. 11 is a first modified example of this embodiment shown in FIG. 10. Here, the safety protection system operating circuit 64 is composed of independent two series of AND logic of two channels, that is, a combination of radiation monitoring devices 42A, 42B and radiation monitoring devices 42C, 42D, and the operation of the safety function is performed in two steps. FIG. 12 is a second modified example of this embodiment shown in FIG. 10. Here, the safety protection system operating circuit 64 is composed of "two out of four" logic with combining four kinds of radiation monitoring devices 42A, 42B, 42C, 42D.

According to this embodiment, by constituting the radiation measurement system from two or four kinds of the radiation monitoring devices configured with logical integrated circuits different from each other, the multiplicity of the radiation signal processing function can be attained and failure based on the common factors can be prevented.

The foregoing discussion discloses and describes merely a number of exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting, of the scope of the invention, which is set forth in the following claims. Thus, the present invention may be embodied in various ways within the scope of the spirit of the invention. Further, combining various features from the different embodiments is contemplated as being within the invention.

What is claimed is:

1. A plant protection instrumentation equipment, comprising:
    a sensor that detects a process signal indicating a quantity of a state of a plant;
    a plurality of A/D converters, each of the A/D converters converts the process signal into a digital signal and outputs a value corresponding to the digital signal;
    a plurality of instrumentation circuits, each of the instrumentation circuits receives the value corresponding to the digital signal from a respective one of the plurality of A/D converters and performs a logical operation using the value; and
    a judgment circuit that judges the state of the plant based on outputs of the plurality of instrumentation circuits and outputs an operation signal based on the outputs of the plurality of instrumentation circuits,
    wherein each of the instrumentation circuits comprises a logical integrated circuit including a set value comparator that compares the value corresponding to the digital signal with a predetermined set value, and outputs a signal when the value corresponding to the digital signal exceeds the set value.

2. The plant protection instrumentation equipment of claim 1, wherein the plurality of instrumentation circuits comprises a first instrumentation circuit and a second instrumentation circuit,
    wherein the first instrumentation circuit comprises a plurality of logical integrated circuits for processing a plurality of process signals, and
    wherein the second instrumentation circuit comprises at least one logical integrated circuit that is electrically independent at least in part from at least one of the plurality of logical integrated circuits in the first instrumentation circuit.

3. The plant protection instrumentation equipment of claim 2, wherein each of the plurality of instrumentation circuit is mounted on a control circuit board,
    wherein the plurality of instrumentation circuits are multiplexed, and
    wherein the judgment circuit judges the state of the plant to output an operation signal based on the signals received from the multiplexed instrumentation circuits.

4. The plant protection instrumentation equipment of claim 3, wherein the judgment circuit is a majority judgment circuit that judges the state of the plant based on the majority of the signals received from the multiplexed instrumentation circuits.

5. The plant protection instrumentation equipment of claim 3, wherein the judgment circuit is a failure changeover circuit that changes the output in accordance with detecting failure in at least one of the multiplexed instrumentation circuits.

6. The plant protection instrumentation equipment of claim 3, wherein the judgment circuit is a selection circuit that outputs the operation signal by judging the outputs of the plurality of instrumentation circuits based on AND judgment.

7. The plant protection instrumentation equipment of claim 3, wherein the judgment circuit is a selection circuit that outputs the operation signal by judging the outputs of the plurality of instrumentation circuits based on OR judgment.

8. The plant protection instrumentation equipment of claim 3, wherein at least one logical integrated circuit of the first instrumentation circuit is different in at least one design factor from the at least one logical integrated circuit of the second instrumentation circuit.

9. The plant protection instrumentation equipment of claim 8, wherein the at least one design factor is at least one of a logical conversion circuit included in the logical integrated circuit, a circuit layout, a manufacture process, and a manufacturer of the logical integrated circuit.

10. The plant protection instrumentation equipment of claim 3, further comprising:
    a terminal arranged upstream of the control circuit boards to input a test process signal; and
    a test voltage generator generating the test process signal.

11. A plant protection instrumentation equipment, comprising:
- a sensor that detects a process signal indicating a quantity of a state of a plant;
- a plurality of A/D converters, each of the A/D converters converts the process signal into a digital signal and outputs a value corresponding to the digital signal;
- first to third instrumentation circuits, each of the instrumentation circuits receives the value corresponding to the digital signal from a respective one of the plurality of A/D converters and performs a logical operation using the value; and
- a judgment circuit that judges the state of the plant based on outputs of the first to third instrumentation circuits and outputs an operation signal based on the outputs of the first to third instrumentation circuits,
- wherein each of the instrumentation circuits comprises a logical integrated circuit including a set value comparator that compares the value corresponding to the digital signal with a predetermined set value, and outputs a signal when the value corresponding to the digital signal exceeds the set value, and
- wherein at least one logical integrated circuit of the first instrumentation circuit is different in at least one design factor from at least one logical integrated circuit of either of the second and third instrumentation circuits.

12. A plant protective instrumentation equipment, comprising:
- a radiation detector that outputs an analog signal corresponding to radiation dosage detected in a plant;
- a radiation monitoring device that monitors behavior of the radiation dosage based on the signal outputted from the radiation detector, comprising:
  - an A/D converter that converts the analog signal outputted from the radiation detector into a digital signal; and
  - a first radiation signal processing collective circuit, comprising:
    - a plurality of radiation signal processing circuits, each of the radiation signal processing circuits calculates radiation dosage based on the digital signal and outputs a calculated result including a calculated radiation dosage;
    - an output extraction circuit that outputs a signal based on the calculation results outputted from the radiation signal processing circuits based on a predetermined extraction rule; and
  - a second radiation signal processing collective circuit which receives the digital signal outputted from the A/D converter and the signals outputted from the plurality of the radiation signal processing circuits and sends at least one output signal bypassing the output extraction circuit.

13. The plant protection instrumentation equipment of claim 12, wherein the extraction rule of the output extraction circuit is a majority determination of the signals outputted from the plurality of radiation signal processing circuits.

14. The plant protection instrumentation equipment of claim 12, further comprising:
- a second failure detection circuit which outputs a third failure signal when detecting a situation that the second radiation signal processing collective circuit has failed.

15. The plant protection instrumentation equipment of claim 12, further comprising:
- a third failure detection circuit which outputs a fourth failure signal when detecting a situation that both the first radiation signal processing circuit and the second radiation signal processing circuit have failed; and
- a first signal processing selection circuit configured to be connected with the third failure detection circuit, which selects and outputs a signal outputted from the first radiation signal processing circuit when the first radiation signal processing circuit does not fail, and selects and outputs a signal outputted from the second radiation signal processing circuit when the first radiation signal processing circuit has failed and the second radiation signal processing circuit has not failed.

16. The plant protection instrumentation equipment of claim 12, further comprising:
- a second signal processing selection circuit which receives a changeover signal and receives signals outputted from a first radiation signal processing circuit and the second radiation signal processing circuit of the plurality of radiation signal processing circuits, selects and outputs a signal outputted from the first radiation signal processing circuit when the changeover signal has not been inputted, and selects and outputs a signal outputted from the second radiation signal processing circuit when the changeover signal has been inputted.

17. The plant protection instrumentation equipment of claim 12, wherein each of the first radiation signal processing circuits comprises a logical integrated circuit having wiring that differs at least in part from at least one other radiation signal processing circuit.

18. A plant protective instrumentation equipment, comprising:
- a radiation detector that outputs an analog signal corresponding to radiation dosage detected in a plant;
- a radiation monitoring device that monitors behavior of the radiation dosage based on the signal outputted from the radiation detector, comprising:
  - an A/D converter that converts the analog signal outputted from the radiation detector into a digital signal;
  - a first radiation signal processing collective circuit, comprising:
    - a plurality of radiation signal processing circuits, each of the radiation signal processing circuits calculates radiation dosage based on the digital signal and outputs a calculated result including a calculated radiation dosage;
    - an output extraction circuit that outputs a signal based on the calculation results outputted from the radiation signal processing circuits based on a predetermined extraction rule; and
  - a first failure detection circuit that outputs a first failure signal when detecting a situation that at most one of the plurality of radiation signal processing circuits has not failed or that the output extraction circuit has failed.

19. The plant protection instrumentation equipment of claim 18, wherein the first failure detection circuit outputs a second failure signal when detecting a situation that at least one of the plurality of radiation signal processing circuits has failed and at least two of the radiation signal control processing circuits has not failed.

20. A plant protection instrumentation equipment, comprising:
- a sensor that detects a process signal indicating a quantity of a state of a plant;
- a plurality of A/D converters, each of the A/D converters converts the process signal into a digital signal and outputs a value corresponding to the digital signal;

a plurality of instrumentation circuits, comprising a first instrumentation circuit and a second instrumentation circuit, each of the instrumentation circuits receives the value corresponding to the digital signal and performs a logical operation using the value; and a judgment circuit that judges the state of the plant based on outputs of the plurality of instrumentation circuits and outputs an operation signal based on the outputs of the plurality of instrumentation circuits, wherein each of the instrumentation circuits comprises a logical integrated circuit including a set value comparator that compares the value corresponding to the digital signal with a predetermined set value, and outputs a signal when the value corresponding to the digital signal exceeds the set value, wherein the value corresponding to the digital signal is a first value that is inputted into a first set value comparator of the first instrumentation circuit and is inputted into a second set value comparator of the second instrumentation circuit, wherein the second instrumentation circuit outputs a second value, and wherein the first set value comparator compares the first value and the second value outputted from the second instrumentation circuit for calculating a deviation between the first value and the second value to judge abnormality.

* * * * *